US012384484B2

(12) United States Patent
Zawistowski et al.

(10) Patent No.: US 12,384,484 B2
(45) Date of Patent: Aug. 12, 2025

(54) INTEGRATED MOTOR MOUNT AND SUSPENSION PIVOT

(71) Applicant: YETI CYCLING, LLC, Golden, CO (US)

(72) Inventors: Peter Zawistowski, Lakewood, CO (US); Steven W. Hoogendoorn, Evergreen, CO (US)

(73) Assignee: YETI CYCLING, LLC, Golden, CO (US)

( * ) Notice: Subject to any disclaimer, the term of this patent is extended or adjusted under 35 U.S.C. 154(b) by 851 days.

(21) Appl. No.: 17/528,923

(22) Filed: Nov. 17, 2021

(65) Prior Publication Data
US 2022/0153381 A1 May 19, 2022

Related U.S. Application Data

(60) Provisional application No. 63/115,432, filed on Nov. 18, 2020.

(51) Int. Cl.
B62K 25/26 (2006.01)
B62K 25/28 (2006.01)
B62M 6/55 (2010.01)

(52) U.S. Cl.
CPC ............ B62K 25/26 (2013.01); B62K 25/286 (2013.01); B62M 6/55 (2013.01)

(58) Field of Classification Search
CPC ......... B62M 6/55; B62K 25/26; B62K 25/286
See application file for complete search history.

(56) References Cited

U.S. PATENT DOCUMENTS

| 421,748 | A | 2/1890 | McErlain |
| 519,855 | A | 5/1894 | Whitaker |
| 591,306 | A | 10/1897 | Tolson |
| 630,232 | A | 8/1899 | Hughes et al. |
| 712,784 | A | 11/1902 | Ellis |

(Continued)

FOREIGN PATENT DOCUMENTS

| CA | 2293366 A1 | 12/1998 |
| CA | 2980086 A1 | 6/2005 |

(Continued)

OTHER PUBLICATIONS

CN-101445020-A translation (Year: 2009).*

(Continued)

Primary Examiner — Christopher B Wehrly
(74) Attorney, Agent, or Firm — Dorsey & Whitney LLP

(57) ABSTRACT

Disclosed herein are examples of motive power sources suitable to power a two-wheeled vehicle. The vehicle may include a suspension linkage and a suspended body. In some examples, the motive power source may include a housing with a boss extending therefrom. The boss may include a first securement structure. The securement structure may include an instantaneous velocity center of the suspension linkage when coupled to the two wheeled vehicle. In some examples, a second securement structure is formed in the suspended body, a bottom link forms a portion of the suspension linkage, the bottom link includes a third securement structure, and an axle is coupled to the first, second, and third apertures. In some examples, the first, second, and third apertures are concentric with the axle.

19 Claims, 32 Drawing Sheets

(56) References Cited

U.S. PATENT DOCUMENTS

| | | |
|---|---|---|
| 724,871 A | 4/1903 | Hunter |
| 944,795 A | 12/1909 | Leet et al. |
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | MacPike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | de Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Ribi |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Creixell |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gally |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,086,080 A | 7/2000 | Scheffer |
| 6,102,421 A | 8/2000 | Lawwill et al. |
| 6,131,934 A | 10/2000 | Sinclair |
| 6,203,042 B1 | 3/2001 | Wilcox |
| 6,206,397 B1 | 3/2001 | Klassen et al. |
| 6,244,610 B1 | 6/2001 | Kramer-Massow |
| 6,406,048 B1 | 6/2002 | Castellano |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 6,969,081 B2 | 11/2005 | Whyte |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| 7,097,190 B2 | 8/2006 | Matsumoto et al. |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,296,815 B2 | 11/2007 | Ellsworth et al. |
| 7,350,797 B2 | 4/2008 | Carroll |
| 7,377,535 B2 | 5/2008 | Chamberlain |
| 7,392,999 B2 | 7/2008 | Oconnor |
| 7,395,892 B2 | 7/2008 | Alonzo |
| 7,413,208 B2 | 8/2008 | Weng |
| 7,427,077 B2 | 9/2008 | Lesage et al. |
| 7,467,803 B2 | 12/2008 | Buckley |
| 7,494,146 B2 | 2/2009 | Tseng |
| 7,556,276 B1 | 7/2009 | Dunlap |
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |

(56) References Cited

U.S. PATENT DOCUMENTS

| | | |
|---|---|---|
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,971,892 B2 | 7/2011 | Sasnowski et al. |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,931,794 B2 * | 1/2015 | O'Connor ............ B62K 25/286 280/284 |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,168,977 B2 | 10/2015 | Mcleay |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,359,039 B2 | 6/2016 | Lumpkin |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy et al. |
| 9,598,140 B2 | 3/2017 | Berthold |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,908,583 B2 | 3/2018 | Matheson et al. |
| 9,919,765 B2 | 3/2018 | Wickliffe et al. |
| 9,988,122 B2 | 6/2018 | Pedretti |
| 10,011,318 B2 | 7/2018 | Beale |
| 10,099,739 B2 | 10/2018 | Nishikawa |
| 10,160,512 B2 | 12/2018 | Beale |
| 10,336,398 B2 | 7/2019 | Hudec |
| 10,343,742 B2 | 7/2019 | Zawistowski |
| 10,363,988 B2 | 7/2019 | Buckley |
| 10,640,169 B2 | 5/2020 | Pedretti |
| 10,703,433 B2 | 7/2020 | Lauer |
| 10,926,830 B2 | 2/2021 | Zawistowski |
| 11,052,964 B2 | 7/2021 | Wallace |
| 12,145,684 B2 | 11/2024 | Zawistowski |
| 2001/0024024 A1 | 9/2001 | Klassen et al. |
| 2003/0038450 A1 | 2/2003 | Lam |
| 2003/0090082 A1 | 5/2003 | Ellsworth et al. |
| 2003/0160421 A1 | 8/2003 | Assier |
| 2003/0193163 A1 | 10/2003 | Chamberlain et al. |
| 2003/0193164 A1 | 10/2003 | Parigian |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0022428 A1 | 2/2006 | Whyte |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0261556 A1 | 10/2009 | Beale et al. |
| 2009/0261557 A1 | 10/2009 | Beale et al. |
| 2009/0278331 A1 | 11/2009 | Graney |
| 2009/0283986 A1 | 11/2009 | Falke |
| 2009/0322055 A1 | 12/2009 | Arraiz |
| 2010/0059965 A1 | 3/2010 | Earle |
| 2010/0102531 A1 | 4/2010 | Graney et al. |
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0115181 A1 | 5/2011 | Weagle |

(56) References Cited

U.S. PATENT DOCUMENTS

| | | |
|---|---|---|
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |
| 2013/0285346 A1 | 10/2013 | Wimmer |
| 2014/0001729 A1 | 1/2014 | Hudec |
| 2014/0015220 A1 | 1/2014 | Talavasek |
| 2014/0042726 A1 | 2/2014 | Canfield et al. |
| 2014/0060950 A1 | 3/2014 | Beutner |
| 2014/0109728 A1 | 4/2014 | Mcrorie |
| 2014/0167385 A1 | 6/2014 | Gogo et al. |
| 2014/0217697 A1 | 8/2014 | Buckley |
| 2014/0318306 A1 | 10/2014 | Tetsuka |
| 2015/0001829 A1 | 1/2015 | Berthold |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0257371 A1 | 9/2016 | Droux |
| 2016/0272273 A1 | 9/2016 | Colegrove et al. |
| 2016/0280317 A1 | 9/2016 | Hoogendoorn |
| 2016/0311493 A1 | 10/2016 | Scheffer |
| 2016/0375956 A1 | 12/2016 | Talavasek et al. |
| 2017/0101152 A1 | 4/2017 | Pedretti |
| 2017/0151996 A1 | 6/2017 | Southall |
| 2017/0313381 A1* | 11/2017 | Mano .......... B62K 25/286 |
| 2018/0037295 A1 | 2/2018 | Beale |
| 2018/0072378 A1 | 3/2018 | Talavasek et al. |
| 2018/0072379 A1 | 3/2018 | Talavasek et al. |
| 2018/0072380 A1 | 3/2018 | Talavasek et al. |
| 2018/0148123 A1 | 5/2018 | Neilson |
| 2018/0229798 A1 | 8/2018 | Hoogendoorn et al. |
| 2018/0265165 A1* | 9/2018 | Zawistowski ...... B62K 25/286 |
| 2018/0297661 A1 | 10/2018 | Beale |
| 2019/0039682 A1 | 2/2019 | Zawistowski |
| 2019/0039687 A1* | 2/2019 | Lay ................. B62M 6/55 |
| 2019/0144069 A1 | 5/2019 | Beale |
| 2019/0300096 A1 | 10/2019 | Chamberlain et al. |
| 2019/0300097 A1 | 10/2019 | Chamberlain et al. |
| 2020/0070930 A1 | 3/2020 | Buckley |
| 2020/0247500 A1 | 8/2020 | Zawistowski |
| 2021/0046996 A1 | 2/2021 | Beale |
| 2021/0269117 A1 | 9/2021 | Zawistowski |
| 2022/0306240 A1 | 9/2022 | Talavasek et al. |

FOREIGN PATENT DOCUMENTS

| | | | |
|---|---|---|---|
| CN | 101445020 A * | 6/2009 | ........ B62K 25/02 |
| DE | 692011 C | 6/1940 | |
| DE | 9405076 U1 | 5/1994 | |
| DE | 9416803 U1 | 12/1994 | |
| DE | 4435482 A1 | 4/1996 | |
| DE | 102019002456 A1 | 10/2019 | |
| DE | 10202110475 3 A1 | 9/2021 | |
| EP | 0422324 A1 | 4/1991 | |
| EP | 0723907 B1 | 7/1998 | |
| EP | 0941917 A2 | 9/1999 | |
| EP | 1026073 A1 | 8/2000 | |
| EP | 1060979 A2 | 12/2000 | |
| EP | 1238900 A2 | 9/2002 | |
| EP | 2540609 A1 | 1/2013 | |
| EP | 2706002 A1 | 3/2014 | |
| EP | 1799534 B1 | 8/2014 | |
| EP | 2812234 A1 | 12/2014 | |
| FR | 541520 A | 7/1922 | |
| FR | 933079 A | 4/1948 | |
| FR | 2774966 A1 | 8/1999 | |
| GB | 17336 | 10/1913 | |
| GB | 2086319 A | 5/1982 | |
| GB | 2338216 A | 12/1999 | |
| GB | 2525870 B | 1/2017 | |
| GB | 2590808 B | 7/2022 | |
| JP | H0725378 A | 1/1995 | |
| NL | 2027223 B1 | 2/2022 | |
| WO | 9422710 A1 | 10/1994 | |
| WO | 9803390 A1 | 1/1998 | |
| WO | 9818671 A1 | 5/1998 | |
| WO | 9856645 A1 | 12/1998 | |
| WO | 199944880 | 9/1999 | |
| WO | 9965760 A1 | 12/1999 | |
| WO | 9944880 A9 | 1/2000 | |
| WO | 03010042 A1 | 2/2003 | |
| WO | 03018392 A1 | 3/2003 | |
| WO | 03021129 A1 | 3/2003 | |
| WO | 2004045940 A2 | 6/2004 | |
| WO | 2005030564 A2 | 4/2005 | |
| WO | 2005030565 A1 | 4/2005 | |
| WO | 2005090149 A1 | 9/2005 | |
| WO | 2006005687 A1 | 1/2006 | |
| WO | 2006032052 A2 | 3/2006 | |
| WO | 2006061052 A1 | 6/2006 | |
| WO | 2008025950 A1 | 3/2008 | |
| WO | 2008130336 A1 | 10/2008 | |
| WO | 2009121936 A1 | 10/2009 | |
| WO | 2010033174 A1 | 3/2010 | |
| WO | 2010103057 A1 | 9/2010 | |
| WO | 2010121267 A1 | 10/2010 | |
| WO | 2012024697 A1 | 2/2012 | |
| WO | 2012027900 A1 | 3/2012 | |
| WO | 2012063098 A1 | 5/2012 | |
| WO | 2012122634 A1 | 9/2012 | |
| WO | 2013028138 A2 | 2/2013 | |
| WO | 2013078436 A1 | 5/2013 | |
| WO | 2013119616 A1 | 8/2013 | |
| WO | 2013142855 A2 | 9/2013 | |
| WO | 2013192622 A1 | 12/2013 | |
| WO | 2014009019 A1 | 1/2014 | |
| WO | 2014029759 A1 | 2/2014 | |
| WO | 2014202890 A1 | 12/2014 | |
| WO | 2015004490 A1 | 1/2015 | |
| WO | 2015196242 A1 | 12/2015 | |
| WO | 2016036237 A1 | 3/2016 | |
| WO | 2016097433 A1 | 6/2016 | |
| WO | 2016134471 A1 | 9/2016 | |
| WO | 2018027192 A1 | 2/2018 | |
| WO | 2018170505 A1 | 9/2018 | |
| WO | 2019010394 A1 | 1/2019 | |
| WO | 2021133996 A1 | 7/2021 | |
| WO | 2021174088 A1 | 9/2021 | |

OTHER PUBLICATIONS

Nicolai Maschinenbau, "History of Nicolai, Gesellschaft für Zweirad und Maschinenbau mbh," at least as early as 1995, 3 pages.

Nicolai, "Nicolai Trombone Frame," at least as early as 1995, 6 pages.

Netherlands Patent Office, "Written Opinion and Search Report," mailed Feb. 22, 2023, for Dutch Application No. 2029897, Dutch with partial English translation, 12 pages.

Aston, Paul, "Robot Bike Co R160 Custom—Review", Outside Magazine, Oct. 17, 2016, 46 pages.

U.S. Patent and Trademark Office, Final Office Action mailed on Jul. 22, 2021, for U.S. Appl. No. 15/925,165, 15 pages.

"Combined Search and Examination Report under Sections 17 and 18(3)", mailed by U.K. Intellectual Property Office on Aug. 25, 2021, for U.K. Application No. GB2102854.3, 8 pages.

(56) References Cited

OTHER PUBLICATIONS

"European Patent Office, EP Extended Search Report", mailed Sep. 21, 2022, for European Application No. 20747607.8, 2 pages.
"Extended European Search Report for EP 18768549.0", mailed Feb. 8, 2021.
"International Search Report & Written Opinion", mailed on Jul. 16, 2021, for PCT Application No. PCT/US2021/020034, 16 pages.
"International Search Report & Written Opinion mailed Apr. 13, 2021, in PCT Application No. PCT/US2020/066980, 16 pages".
"International Search Report mailed Jun. 19, 2020, in PCT Application No. PCT/US2020/016265, 18 pages".
"Netherlands Patent Office, Written Opinion and Search Report mailed Sep. 24, 2021", in Dutch and English, for Netherlands Application No. 2027223, 17 pages.
"U.K. Intellectual Property Office, "Combined Search and Examination Report under Sections 17 an 18(3),"", mailed Apr. 21, 2021, for U.K. Application No. GB2020235.4, 6 pages.
Aston, "Canyon Sender—Review", https://www.pinkbike.com/news/canyon-sender-review-2017.html, Mar. 13, 2017, 33 pages.
Aston, "Robot Bike Co R160—First Look", https://www.pinkbike.com/news/robot-bike-co-r160-first-look-2016.html (Accessed Jun. 30, 2020), May 27, 2016, 39 pages.
Author Unknown, "Sarrus Linkage", Wikipedia, http://en.wikipedia.org/wiki/Sarrus_linkage, 1 page, at least as early as Aug. 20, 2010.
Chen, "Design of Structural Mechanisms", A dissertation submitted for the degree of Doctor of Philosophy in the Department of Engineering Science at the University of Oxford, St Hugh's College, 2003, 160 Pages.
Cunningham, "First Look: Felt 2014", https://www.pinkbike.com/news/First-Look-Felt-2014.html (Accessed Jun. 30, 2020), Aug. 7, 2013, 20 pages.
Db Bikes, "Felt Compulsion 50 Mountain Bike 2017", https://downhillbikesforsale.com/products/Felt-Compulsion-50-Mountain-Bike-2017.html, (Accessed Jun. 30, 20), 9 pages.
EP, "European Extended Search Report", Application No. 12851566.5, May 28, 2015, 7 pages.
EP, "Extended European Search Report", Application No. 11818903.4, Sep. 15, 2015, 8 pages.
EP, "Supplementary Search Report", Application No. 05798319.9, Dec. 11, 2009, 1 page.
European Patent Office, "Communication Pursuant to Article 94(3) EPC", mailed Jul. 8, 2022, for European Application No. 18768549.0, 6 pages.
European Patent Office, "Extended European Search Report", mailed Oct. 4, 2022, for European Application No. 20747607.8, 6 pages.
Foale, "Motorcycle Handling and Chassis Design: The Art and Science", https://epdf.pub/motorcycle-handling-and-chassis-design-the-art-and-science.html, Mar. 2002, 498 pages.
GB IPO, "Combined Search and Exam Report", App. No. 2020235.4, Apr. 21, 2021, 6 pages.
German Patent Office, "Examination Notice and Search Report", mailed Apr. 13, 2022, for German Application No. 10 2020 134 843.6, 7 pages.
Giant Bicycles, "Anthem Advanced Pro 29 1", https://www.giant-bicycles.com/US/anthem-advanced-pro-29-1-2021, (Accessed Sep. 14, 2020), 8 pages.
Kavik Bicycles, "Kavik Regen Suspension", (Accessed Jun. 30, 20), 2 pages.
Li, "Movable Spatial 6R Linkages", XP055249075, Retrieved from the Internet on Oct. 13, 2016: URL:http://people.ricam.oeaw.ac.at/z.li/publications/talks/6.pdf, Oct. 2, 2013, 48 Pages.
Mountain Bike Action, "Bike Test: Felt Compulsion 1 27.5", https://mbaction.com/oct-felt-compulsion-1-27-5/, (Accessed Jun. 30, 2020), 10 pages.
MTBR: Mountain Bike Review Forum, "Jayem Discussion Starter #1—Knolly Suing Intense for Building Bikes with Seat-tubes in Front of the BB", https://www.mtbr.com/threads/knolly-suing-intense-for-building-bikes-with-seat-tubes-in-front-of-the-bb.1173867/, Jan. 2021, 16 pages.
Overholt, Zach, Bikerumor, "IB17: Tantrum Cycles makes it to production, gets noticed by Adventure Capitalists", https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
"International Search Report and Written Opinion", Application No. PCT/US2011/048696, Dec. 14, 2011, 10 pages.
"International Search Report and Written Opinion", Application No. PCT/US2015/065090, Feb. 12, 2016, 11 pages.
"International Search Report and Written Opinion", Application No. PCT/US2012/066427, Jan. 18, 2013, 12 pages.
"International Search Report and Written Opinion", Application No. PCT/US2018/041054, Sep. 28, 2018, 12 pages.
"International Search Report and Written Opinion", Application No. PCT/US2018/023124, Aug. 2, 2018, 14 pages.
"International Search Report and Written Opinion", Application No. PCT/US2005/33410, Nov. 29, 2006, 5 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, "First Ride: 2021 Canyon Sender CFR", https://www.pinkbike.com/news/first-ride-2021-canyon-sender-cfr.html, Aug. 11, 2020, 23 pages.
Sarrut, "Note Sur La Transformation Des Mouvements Rectilignes Alternatifs", Académie des Sciences, 36, 1036-1038, 1853, 5 Pages.
U.S. Patent and Trademark Office, "Non-Final Office Action", mailed Sep. 16, 2022, for U.S. Appl. No. 16/705,049, 10 pages.
U.S. Patent and Trademark Office, "U.S. Appl. No. 62/815,675", Filed on Mar. 8, 2019, Mar. 8, 2019.
U.S. Patent and Trademark Office, , "U.S. Appl. No. 62/833,496", Filed on Apr. 12, 2019, Apr. 12, 2019.
U.S. Patent and Trademark Office, , "U.S. Appl. No. 62/867,169", filed Jun. 26, 2019, Jun. 26, 2019.
Worsey, "Forbidden Druid Review—Are high pivots just for downhill?" Enduro, [online], Mar. 4, 2019 [retrieved on Jun. 16, 2021], From Internet: <url: https://enduro-mtb.com/en/fobidden-druid-review/>; 15 pages,.
Zawistowski, Think Turquoise, http://www.yeticycles.com/blog/?p=237 [Retrieved from the Internet on Jul. 27, 2011], Jul. 18, 2010.
Zawistowski, "Quantifying Wheel Path", Think Turquoise, http://www.yeticycles.com/blog/?p=237 [Retrieved from the Internet on Jul. 27, 2011], Jul. 18, 2010, 4 Pages.
Brown, "Preview: Nicolai Bikes Available in the U.S.: The belt-drive, big-hit bikes will be distributed by Nicolai USA," Bike Mag, Jun. 3, 2014, 9 pages.
Overholt, "SOC 14: Effigear Calls in the Cavalerie for new Gear Box Bikes in the US," Bike Rumor, Apr. 23, 2014, 16 pages.
Spot Bikes, Mayhem 140, "Inversion," Jun. 17, 2024, 1 page.

* cited by examiner

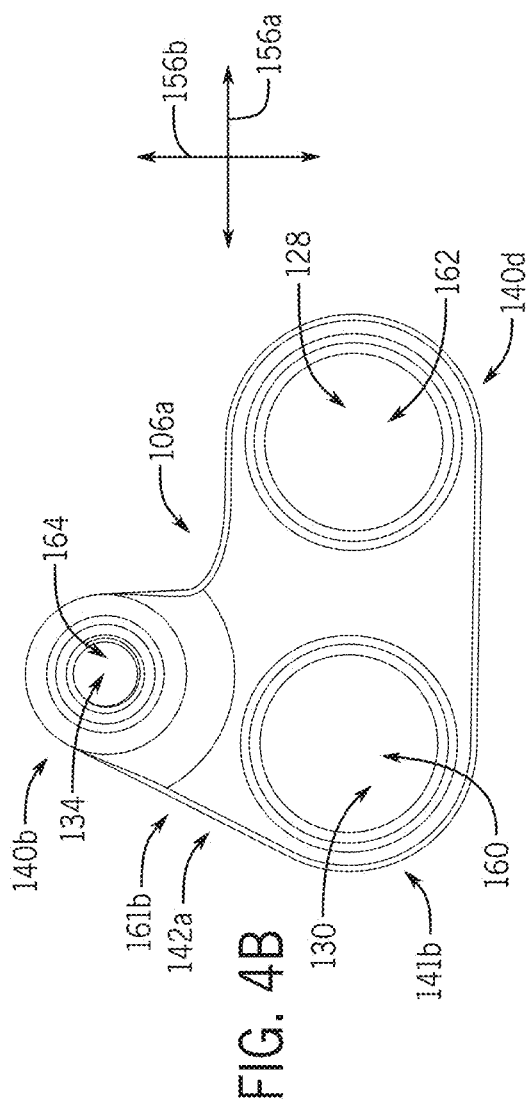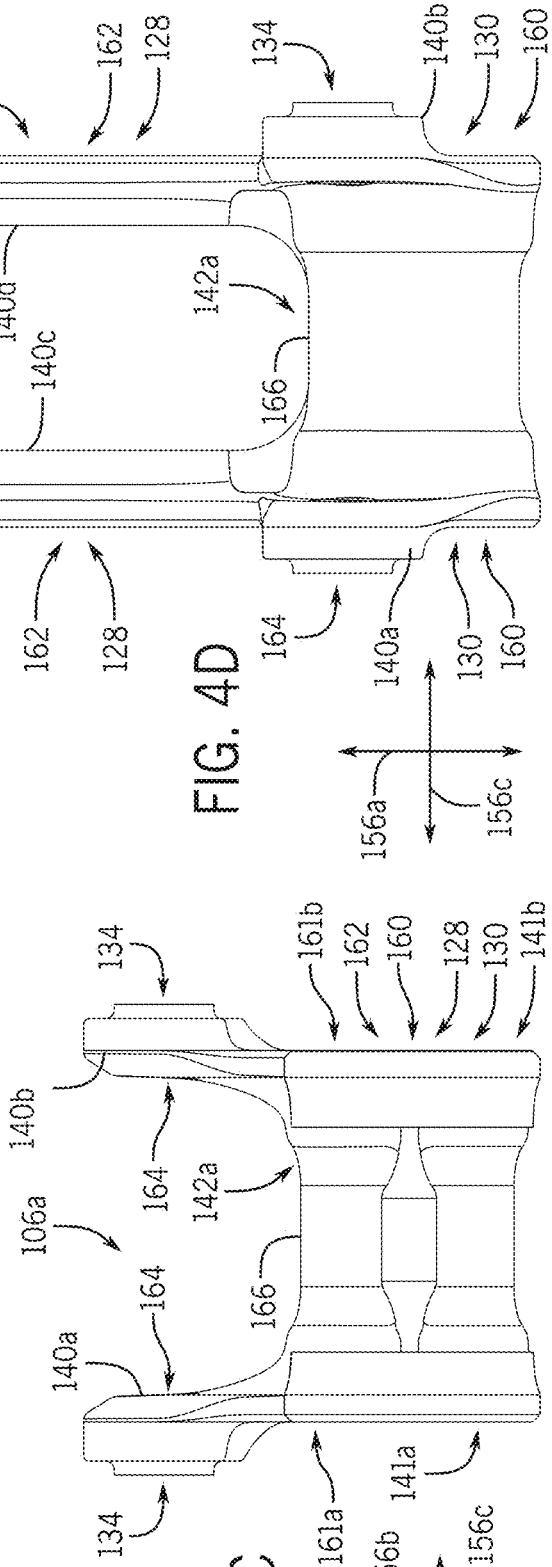

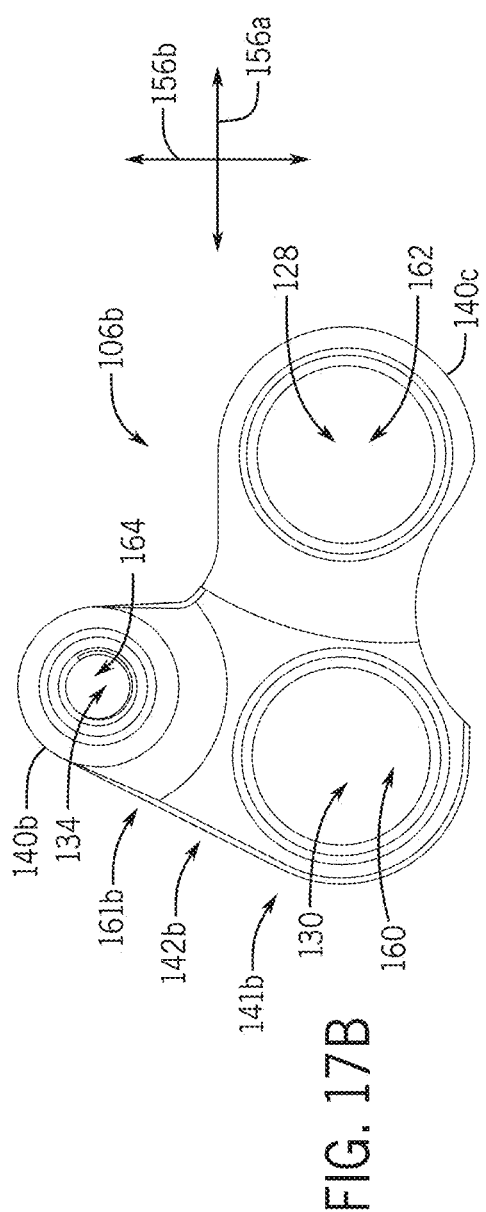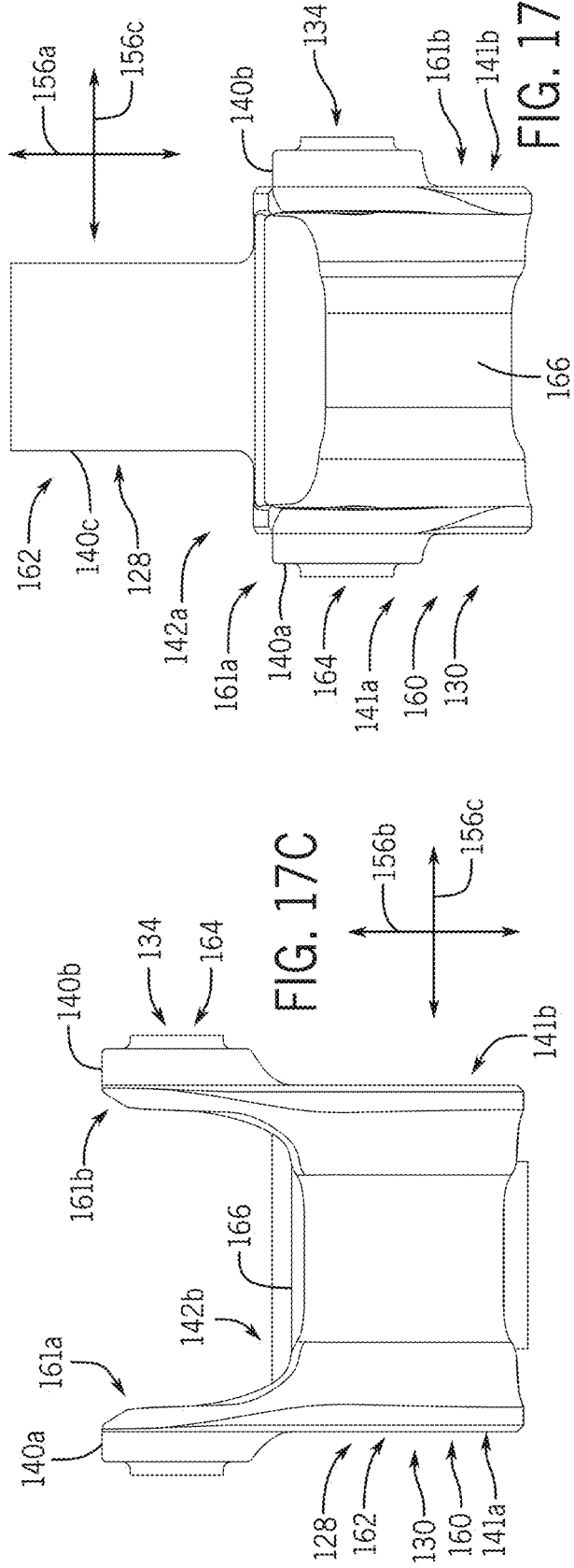
FIG. 17B
FIG. 17C
FIG. 17D

INTEGRATED MOTOR MOUNT AND SUSPENSION PIVOT

CROSS-REFERENCE TO RELATED APPLICATIONS

This application claims priority to U.S. Provisional Patent Application No. 63/115,432, filed Nov. 18, 2020, entitled "Integrated Motor Mount and Suspension Pivot," the contents of which are incorporated herein in their entirety for all purposes.

The following applications are also incorporated herein by reference in their entireties, for all purposes: U.S. Provisional Patent Application 62/473,259, filed Mar. 17, 2017 entitled "Vehicle Suspension Linkage"; U.S. patent application Ser. No. 15/925,165, filed Mar. 19, 2018 entitled "Vehicle Suspension Linkage"; U.S. Provisional Patent Application 62/953,384, filed Dec. 24, 2019 entitled "Constrained Instantaneous Velocity Center Linkage Assembly for Vehicle Suspension"; U.S. Provisional Patent Application 62/800,181, filed Feb. 1, 2019 entitled "Multi-Body Vehicle Suspension Linkage"; U.S. Provisional Patent Application 62/815,675, filed Mar. 8, 2019 entitled "Multi-Body Vehicle Suspension Linkage"; U.S. Provisional Patent Application 62/833,496, filed Apr. 12, 2019 entitled "Multi-Body Vehicle Suspension Linkage"; U.S. Provisional Patent Application 62/867,169, filed Jun. 26, 2019 entitled "Multi-Body Vehicle Suspension Linkage"; U.S. Provisional Patent Application 62/894,469, filed Aug. 30, 2019 entitled "Multi-Body Vehicle Suspension Linkage"; and U.S. patent application Ser. No. 16/779,406, filed Jan. 31, 2020 entitled "Multi-Body Vehicle Suspension Linkage".

TECHNICAL FIELD

The technology described herein relates to vehicle suspension systems, specifically, to linkages within a vehicle suspension system.

BACKGROUND

Electronic bikes (also referred to as pedelecs or e-bikes) are a popular form of transportation. E-bikes may provide an extended riding range and speed for users, for example by supplementing the power provided by a user through a traditional crank and pedal assembly with power provided by a motive power source like an electric motor. However, traditional e-bikes may be heavy and bulky due to the need to package the motive power source and its source of electrical power (e.g., batteries).

Some e-bikes may include a suspension, such as a rear suspension. Vehicle suspension terminology depends upon the reference frame considered. Consider a static vehicle that has two wheels, each of which are supported by the ground and a suspended body which is operatively coupled to each wheel. In a two-wheel vehicle, such as an e-bike, there is typically one rear wheel known as the driven wheel which includes a driven cog. There is also one front wheel. A driving cog is operatively coupled to the suspended body. A driving chain or belt connects the driven cog and the driving cog. The driving cog, which is connected to the driven cog via the driving chain/belt, is rotated by a crank under human power, or by a motor, or by combined motor and human power. The reaction between the driven wheel and the ground causes the vehicle to accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are operatively coupled to each other in a manner that allows the bodies to flex, cam, rotate or translate relative to one another. The linkage constrains the movement in which the driven wheel and brake may travel relative to the suspended body. A combination of damper(s) and/or spring(s) (e.g., a shock) is/are typically arranged to react to relative motion between the suspended body and the driven wheel. The linkage is highly responsible for the vehicle's dynamic response to acceleration and deceleration as well as the mechanical advantage over the shock.

The information included in this Background section of the specification, including any references cited herein and any description or discussion thereof, is included for technical reference purposes only and is not to be regarded as subject matter by which the scope of the invention as defined in the claims is to be bound.

BRIEF SUMMARY

In one aspect, a motive power source for a two-wheeled vehicle includes a housing that contains the internal components of the motive power source, where the housing includes a boss with a first securement structure where the securement structure is configured to attach the motive power source to a suspended body of the two-wheeled vehicle and to a suspension linkage of the two-wheeled vehicle.

The motive power source may also include where the boss is integrally formed with the housing.

In one aspect, a two-wheeled vehicle includes a suspended body, a suspension linkage including a bottom link body pivotally coupled to the suspended body at a joint, and a motive power source coupled to both the suspended body and the bottom link body at the joint.

The two-wheeled vehicle may also include an instantaneous velocity center (IVC) of the suspension linkage located within the first, second, and third securement structure.

The two-wheeled vehicle may also include the axle, the first securement structure, the second securement structure, and the third securement structure concentric with one another.

The two-wheeled vehicle may also include a first securement structure formed in the suspended body; a second securement structure formed in the bottom link body; a housing forming an exterior portion of the motive power source, wherein a first boss extends from the housing, the first boss having a third securement structure; and an axle coupled to the first, second, and third securement structures.

The two-wheeled vehicle may also include an axle assembly including the axle, where the axle includes an expandable portion at a first end of an elongate body and an internally threaded portion located proximate to the expandable portion, a tapered collet including an aperture therethrough, a fastener element is adapted to be received in the aperture and including an externally threaded portion adapted to mate with the internally threaded portion of the axle, where when the fastener is mated with the axle, the fastener causes the tapered collet to expand the expandable portion to secure the axle assembly to the suspended body.

The two-wheeled vehicle may also include where the suspension linkage includes a plurality of linkage bodies including the suspended body, a second body, the bottom link body, a fourth body, a fifth body, and a sixth body operatively connected defining at least seven primary instantaneous velocity centers (IVCs) where, the suspended body is a binary link, a shock assembly is configured to resist movement between two or more of the suspended body, the second body, the bottom link body, the fourth body, the fifth body, or the sixth body, and at least one primary IVC migration path reverses as the suspension moves from an at least partially extended state to an at least partially compressed state.

The two-wheeled vehicle may also include where the boss is selectively removable from the housing.

The two-wheeled vehicle may also include a second boss selectively removable from the housing, where the first boss defines the IVC in a first location when coupled to the housing while the second boss is not coupled to the housing, and the second boss defines the IVC in a second location when coupled to the housing while the first boss is not coupled to the housing.

The two-wheeled vehicle may also include where the housing is a load bearing member of the suspension linkage.

The two-wheeled vehicle may also include where the plurality of linkage bodies define a driven wheel-path.

The two-wheeled vehicle may also include wherein the suspended body (102) includes a jointed connection with the bottom link body (106) defining a primary IVC[102][106] (128), and a jointed connection with the fifth body (110) defining a primary IVC[102][110] (124), the bottom link body (106) includes a jointed connection with the fourth body (108) defining a primary IVC[106][108] (130), and a jointed connection with the sixth body (112) defining primary a IVC[106][112] (134), the fifth body (110) includes a jointed connection with the second body (104) defining a primary IVC[104][110] (132), and a jointed connection with the sixth body (112) defining a primary IVC[110][112] (122), and the second body (104) includes a jointed connection with the fourth body (108) defining a primary IVC[104][108] (126), where a migration path defined by the IVC[106][112] (134) reverses as the suspension moves from the at least partially extended state to the at least partially compressed state.

The two-wheeled vehicle may also include where a migration path defined by the IVC[106][108] (130) reverses as the suspension moves from the at least partially extended state to the at least partially compressed state.

The two-wheeled vehicle may also include where the second body (104) is a driven wheel carrier body or a brake carrier body.

The two-wheeled vehicle may also include where the second body (104) is a driven wheel carrier body and a brake carrier body.

The two-wheeled vehicle may also include where the fourth body (108) is a driven wheel carrier body or a brake carrier body.

The two-wheeled vehicle may also include where the fourth body (108) is a driven wheel carrier body and a brake carrier body.

The two-wheeled vehicle may also include where a lower base line is defined by the primary IVC[102][106] (128) and the primary IVC[106][108] (130), an upper base line is defined by the primary IVC[102][110] (124) and the primary IVC[104][110] (132), and the primary IVC[110][112] (122) is located outside the upper and lower base lines.

The two-wheeled vehicle may also include where a line defined by the primary IVC[106][112] (134) and the primary IVC[110][112] (122) is located outside the primary IVC[102][106] (128) and the primary IVC[106][108] (130).

The two-wheeled vehicle may also include where the primary IVC[106][112] (134) and the primary IVC[106][108] (130) are on the same side of the primary IVC[102][106] (128). Other technical features may be readily apparent to one skilled in the art from the following figures, descriptions, and claims.

BRIEF DESCRIPTION OF THE DRAWINGS

FIG. 4B is a side elevation view of the link body of FIG. 4A.

FIG. 4C is a rear elevation view of a link body of FIG. 4A.

FIG. 4D is a plan view of the link body of FIG. 4A.

FIG. 17B is a side elevation view of the link body of FIG. 17A.

FIG. 17C is a rear elevation view of a link body of FIG. 17A.

FIG. 17D is a plan view of the link body of FIG. 17A.

DETAILED DESCRIPTION

Figure 1:
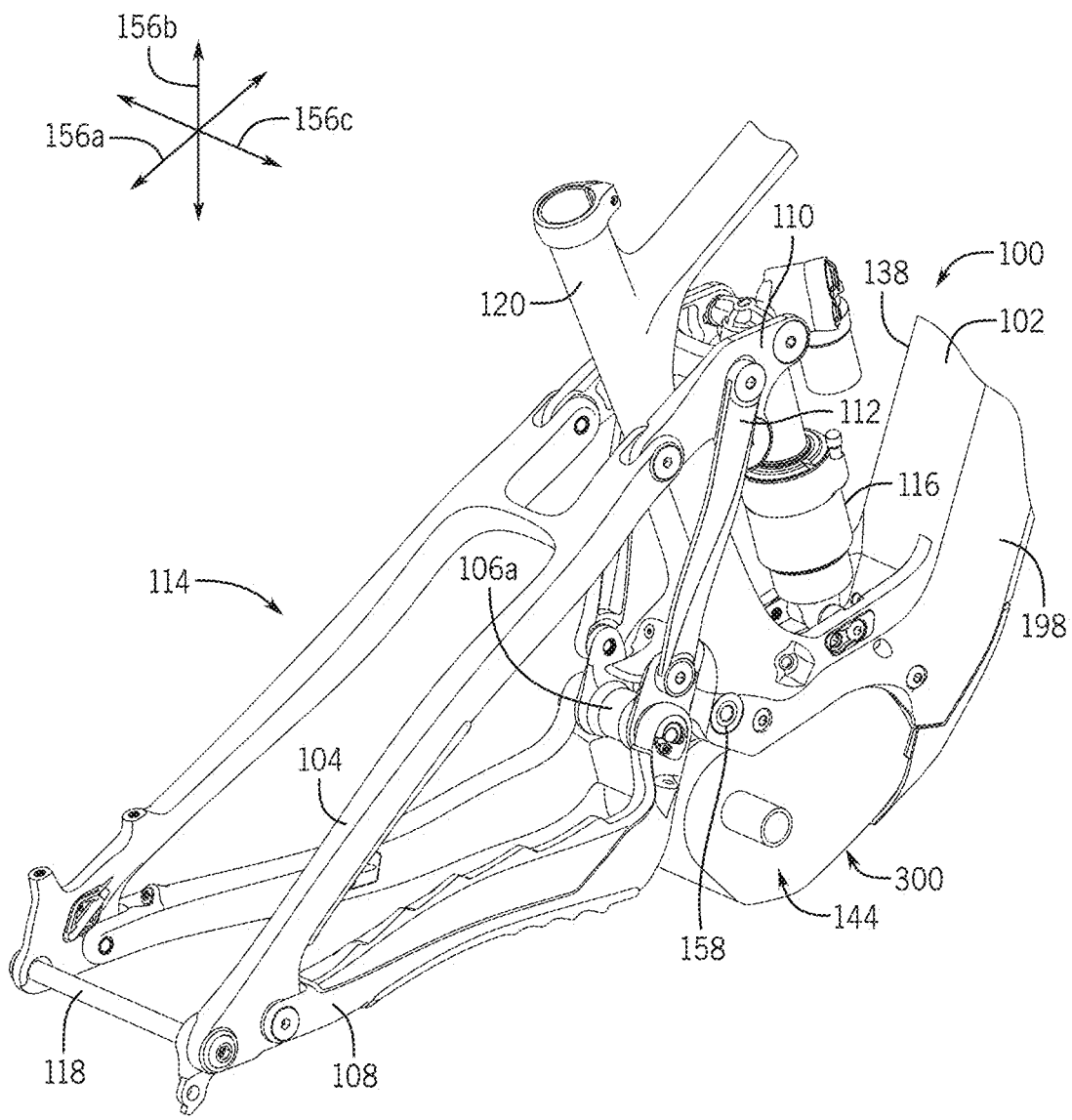
FIG. 1 is an isometric view of a frame of a two-wheeled vehicle including a suspension linkage with a motive power source coupled to the frame and the suspension linkage.

Disclosed herein are systems and methods of incorporating a motive power source into a frame and suspension of a two-wheeled vehicle such as a two wheeled vehicle like a bicycle, motorcycle or e-bike. As used herein an e-bike means any two-wheeled vehicle powered at least in part by a motive power source. A motive power source may be such as an electric motor powered by an on-board power source such as a battery. In other examples, a motive power source may be an engine such as an internal combustion engine, or a combination of an engine and a motor, or a combination of one or more of these with a transmission. An e-bike may also include a crank and pedals to enable the e-bike to be powered at least in part by a rider's legs.

Methods and devices are described herein to couple a motive power source to a frame, and/or suspension linkage of the two-wheeled vehicle. In some implementations a mount point for a motive power source is used to both mount the motive power source to the frame and also to serve as a joint in the suspension linkage. The various embodiments of combined motor mounts and suspension pivots may enable the design of lighter, more compact, simpler, and configurable suspension linkages and frames for two-wheeled vehicles such as e-bikes and/or motorcycles.

For clarity, directions are defined with respect to the frame 100 of the two wheeled vehicle. The longitudinal direction 156a is a direction generally aligned with the motion of the vehicle when the driven wheel rotates relative to the ground, (e.g., either forward or backward). The lateral direction 156b is a direction generally normal to the surface over which the vehicle travels (e.g., up or down). The transverse direction 156c is a direction generally to the left or right of the longitudinal direction 156a.

Disclosed herein is a system or linkage that operatively couples a suspended body to a driven wheel. In accordance with the various embodiments provided herein, the suspension system linkage improves suspension performance based on the interrelationships of its linkage bodies and the related instantaneous velocity centers (IVCs). In one example, the linkage has 15 IVCs. In particular, the linkage may be a 6-bar linkage.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art.

Accordingly, provided herein are various methods or algorithms suitable for analyzing suspension systems. For example, various methods are provided for calculating unknown IVCs of a linkage for a suspension system. Such analytical methods are provided for fuller understanding of the various mechanisms discussed herein. For example, a triangular method may be used to determine an unknown IVC of interest. Additionally or alternatively, plotting the positional relationships of IVCs in a linkage of a suspension can be utilized. Accordingly, the positions of IVCs may change depending on the configuration of the system. A particular IVC may be in a different position depending on whether the system is in a compressed or extended state. IVC migration paths can be determined and vectors running tangential to such migration paths can be analyzed. Thus, the interrelationships between IVCs can be analyzed, allowing for a mathematical analysis of the movement of the linkage subsystem. Finally, methods to calculate anti-squat, anti-rise, and leverage rate is detailed.

As it is understood that throughout this disclosure the relationship of various linkages are described with respect to characteristics of those linkages. One analysis system useful for assessing these relationships is the Mobility Analysis of Mechanisms. The Mobility Analysis of Mechanisms (Kutzbach (or Grubler) mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots can include revolute, slider, cam joints, or other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real world accuracy of the characteristics discussed herein while allowing for real world variance in the characteristics. Note that if bodies are coupled as one and not considered completely rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$\text{mobility} = m(3n-1-p)+p$$

n=number of bodies (or links or members)
p=number of joints
$\Sigma f$=sum of the kinetic variables in the mechanism As an example, this equation may be applied to a 4-bar linkage. The following solves the equation for a 4-bar linkage:

$p=n=4$ $m=3(n-1-p)+p$ $m=3(4-1-4)+4$ $m=3(-1)+4$ $m=-3+4$ $m=1$

As another example, this equation may be applied to a 6-bar linkage. The following solves the equation for a 6-bar linkage:

$n=6$ $p=7$ $m=3(n-1-p)+p$ $m=3(6-1-7)+7$ $m=3(-2)+7$ $m=-6+7$ $m=1$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing vehicle suspension linkages design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT[T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to a body-1 and a body-2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but always depend upon suspended body-1 since this is the body in which a passenger or rider will be included.

As used herein DIVC[AD] can define both the acceleration and deceleration response of the vehicle.

As used herein DIVC[A] can define the acceleration response of the vehicle.

As used herein DIVC[D] can define the deceleration response of the vehicle.

As used herein DIVC[C] is defined as a DIVC that includes the acceleration component. DIVC[C] can be equal to DIVC[A] or DIVC[AD].

As used herein DIVC[E] is defined as a DIVC that includes the deceleration component. DIVC[E] can be equal to DIVC[D] or DIVC[AD].

As used herein DIVC is a general term and therefore a DIVC may be a DIVC[AD] or a DIVC[A] or a DIVC[D] or a DIVC[C] or a DIVC[E]. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC [AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z]].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicles 2 wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. One hundred percent anti-squat is when the anti-squat force is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point an anti-squat below 100% is ideal so that the driving force is minimized, and the suspension can be utilized later in the travel where pedaling typically does not occur. This also minimizes feedback from the driving force to the rider. It is important to note that too high of an anti-squat is not ideal because it results in high feedback from the driving force to the rider and is detrimental to pedaling efficiency because the load transfer and anti-squat force are far from equilibrium.

When the vehicle decelerates the force distribution changes and the front wheel load is increased while the rear wheel load is decreased. As a result, the rear suspension tends to extend or rise. This is known in vehicle dynamics as anti-rise. The magnitude of anti-rise is directly related to the DIVC[E] migration.

One hundred percent anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Based upon the number of bodies present in the structure, the total number of instantaneous velocity centers (IVCs) can be determined. The following equation can be used:

$$\text{Number of Instance Centers} = N = \frac{n(n-1)}{2}$$

n=number of bodies moving relative to one another
N=total number of instantaneous velocity centers of the linkage As an example, this equation may be applied to a 4-bar linkage. In this example, n=4. The following solves the equation for a 4-bar linkage.

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

Turning to the figures, FIG. 1 is an isometric view of a frame 100 for a two-wheeled vehicle. In accordance with various embodiments as shown in FIG. 1, the suspension system can include a 6-bar linkage. FIG. 1 specifically illustrates a 6-bar suspension system in the extended state. In this embodiment, the suspended body 102 is suspended by the suspension system at least at the rear of the bike and preferably by a suspension fork at the front, which is not shown herein for simplicity of the figures. As shown in FIG. 1, a seat stay 104 is a dynamic body (DB), comprising a wheel carrier and a brake carrier. Note that in other embodiments the seat stay 104 may be a wheel carrier only, a brake carrier only, or it can be a non-dynamic body. The seat stay 104 can include a driven wheel axis 118. In accordance with the embodiment, the seat stay 104 is operatively coupled to a driven wheel. The driven wheel engages with the ground. A brake rotor is operatively connected to the driven wheel, and the driven wheel is operatively connected to seat stay 104. A front wheel is operatively connected to a fork which is operatively connected to suspended body 102. A chain stay 108 is operatively coupled to the seat stay 104. An axle 170 is operatively coupled to suspended body 102, the chain stay 108 and a center link 112. A top link 110 is operatively coupled to the suspended body 102, the seat stay 104 and the center link 112. A shock assembly 116 is operatively coupled to the suspended body 102 and the top link 110. As illustrated in the formula above, there are 15 IVCs in a 6-bar linkage.

Figure 2:
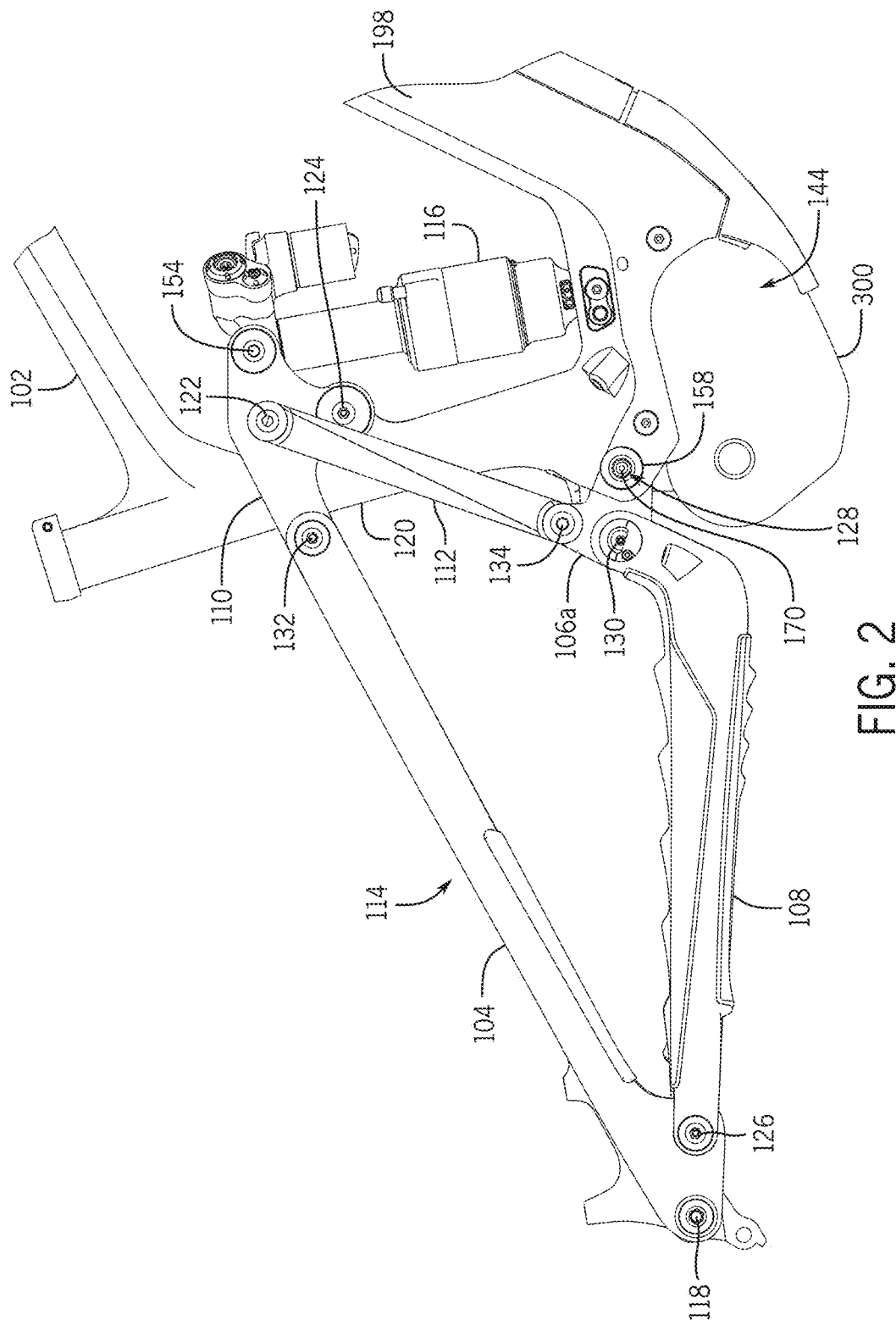
FIG. 2 is a side elevation view of the frame of FIG. 1.

Seven of the 15 IVCs are shown in FIG. 2: the IVC[110][112] 122, the IVC[102][110] 124, IVC[104][108] 126, the IVC[102][106] 128, the IVC[106][108] 130, the IVC[104][110] 132, and the IVC[106][112] 134. The IVCs of the suspension linkage 114 are described in more detail in U.S. patent application Ser. No. 15/925,165, filed Mar. 19, 2018 entitled "Vehicle Suspension Linkage" which is incorporated herein by reference in its entirety for all purposes.

FIGS. 1-2 show views of a frame 100 of a two wheeled vehicle such as an e-bike. The frame 100 includes a suspension linkage 114 coupled to the suspended body 102. The suspended body 102 forms a receptacle 144 operative to receive a motive power source 300. In some examples, the suspended body 102 includes a seat tube 120 operative to receive a seat post 120 of a seat assembly (not shown). In some examples, the suspended body 102 includes a downtube 198. The seat tube 120, downtube 198, and a top tube may form a suspended body 102 in the form of a front triangle. The motive power source 300 may be coupled to the suspended body 102 and to the suspension linkage 114. In some examples the motive power source 300 includes a mount that couples the motive power source 300 to the frame 100 and also to the suspension linkage 114. The motive power source 300 may be at least partially received in the downtube 198 or seat tube 120. For example, the receptacle 144 may be formed in the seat tube 120 or the downtube 198. In some examples, a portion of the receptacle 144 may be formed in the seat tube 120 and another portion in communication with the first portion may be formed it the downtube 198. For example, the seat tube 120 and the downtube 198 may converge near a lower portion of the suspended body 102 to form a combined structure that receives at least a portion of the motive power source. Such structures may enable the compact integration of the motive power source with the frame 100.

The suspended body and/or any of the links of the suspension linkage 114 may be made from a variety of suitable strong and lightweight material such as steel, aluminum, titanium, magnesium, or alloys related to the above, and/or composites such as carbon fiber, glass, or aramid reinforced fiber composites, or the like.

Figure 3:
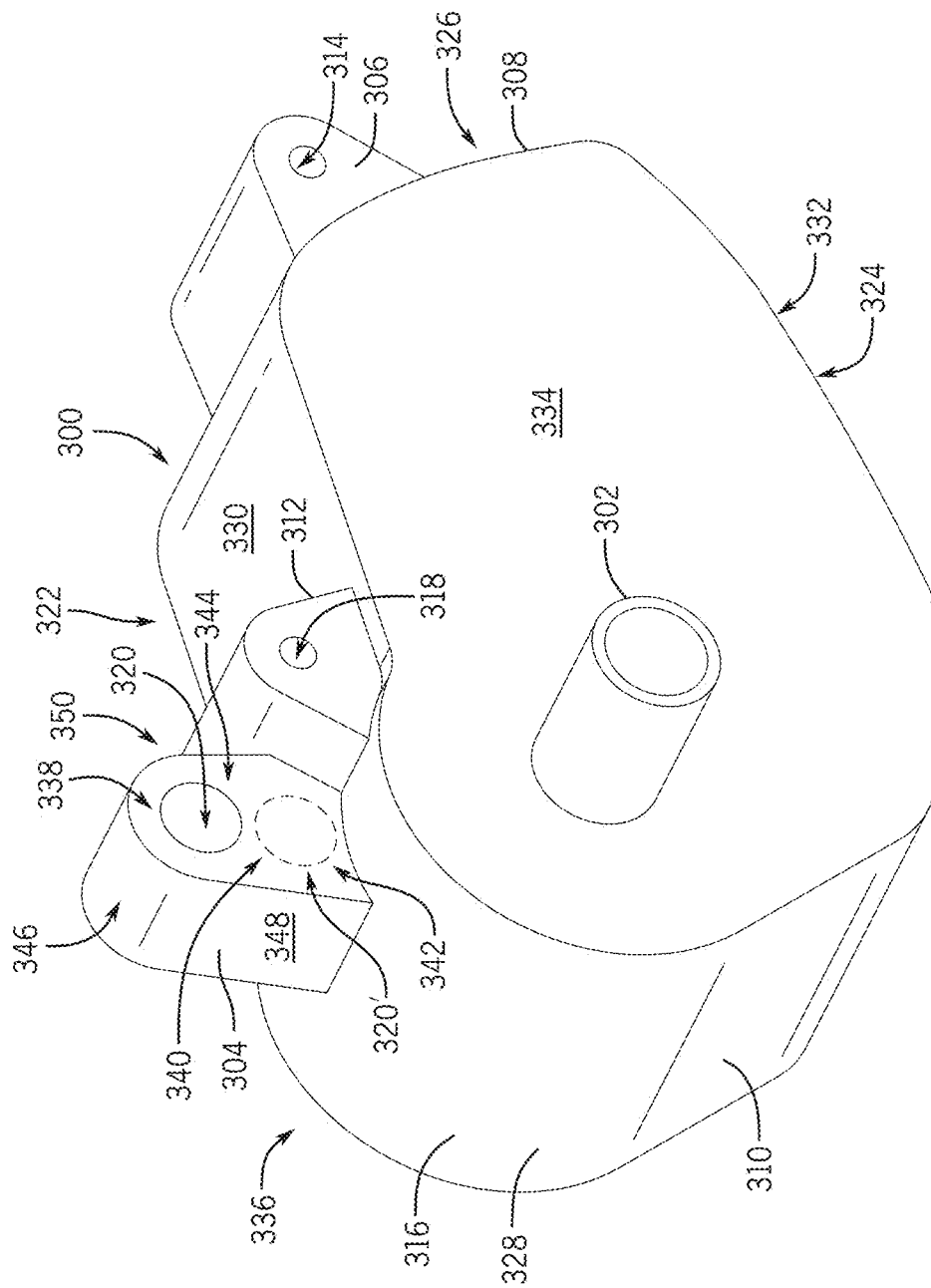
FIG. 3 is a close-up view of a motive power source suitable for use with the frame of FIG. 1.
Figure 4A:
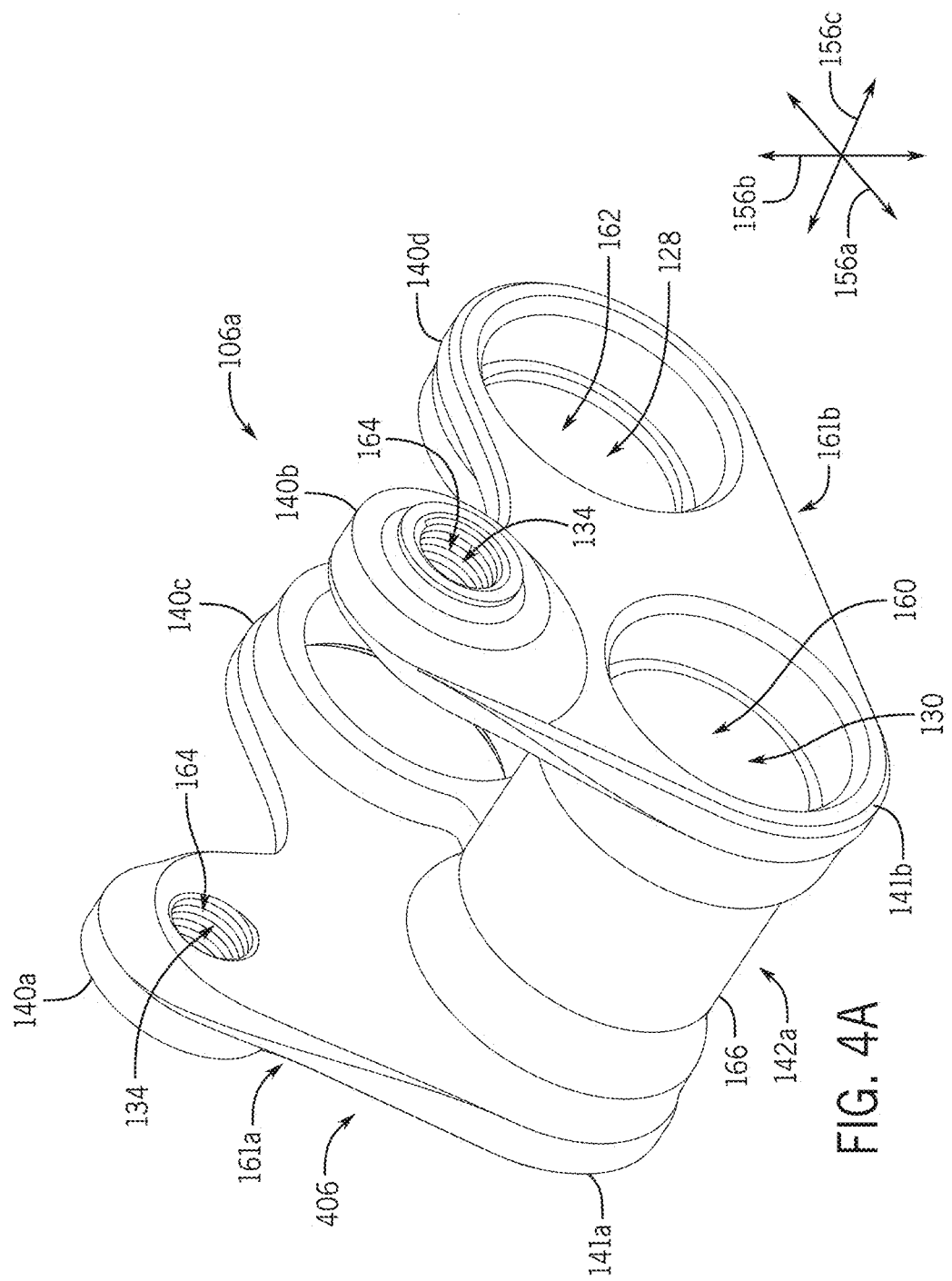
FIG. 4A is an isometric view of a link body of the suspension linkage of FIG. 1.

FIG. 3 shows an example of a motive power source 300 for use with the frame 100. One example of a suitable motive power source is the STEPS motor from Shimano (see, e.g., https://www.shimano-steps.com/e-bikes/north-America/en/product-informationl/mtb/e8000). The motive power source 300 may be an electric motor, an internal combustion engine, transmission, and/or a combination thereof. The motive power source 300 includes a power interface 302 that may provide motive power to the driving belt, chain, and/or shaft to propel the vehicle. Alternately or additionally, the power interface 302 may receive power from the driving belt, chain, or shaft, such as to recharge batteries that power the motive power source 300. The motive power source 300 includes a housing 316 that contains the internal components of the motive power source 300. The housing 316 may be made from a variety of suitable material that is lightweight and strong enough to withstand the forces imparted to the housing 316 in use. Some example materials include steel, aluminum, magnesium, titanium, plastics, composite materials, and/or alloys thereof. In some implementations, the housing 316 may be a load-bearing member that supports loads imparted to the frame 100 and/or suspension linkage 114 such as when the e-bike is ridden, pedaled, or propelled by the motive power source 300. The housing 316 may include an aft portion 310 and a forward portion 308 located relative to one another along the longitudinal direction 156a.

In some examples, the housing 316 includes one or more bosses that define part of the housing. For example, the motive power source 300 may include a housing 316 that includes bosses 304, 312, and 306. Any of the bosses disclosed herein (e.g., the bosses 304, 306, and/or 312) may be integrally formed with a housing. For example, a boss may be integrally formed with the housing such as by casting or forging the boss with the housing. In some examples, the boss may be formed in a housing by removing material from the housing, such as by a machining or other selective removal process. For example, a housing may be formed with excess material that is removed by a process such as machining to form the boss. In other examples, a boss may be selectively attachable to the housing of the motive power source, such as with the motive power sources 1000 and 1900 described herein. Attachment to the frame 100 or suspension linkage 314 can be by attachment to the main body of the housing or attachment to a boss portion of the housing to the frame and/or suspension linkage 314.

One or more of the bosses may define a securement structure for mounting the motive power source 300 to the frame 100, the suspension linkage 114, or both. In one example, at least one boss may include one or more apertures as securement structures defined therethrough to facilitate mounting the motive power source 300 to the frame 100, to the suspension linkage 114, or to both. In another example, a boss may have a securement structure of one or more pins extending outwardly from the boss in any of the lateral direction, transverse direction, longitudinal direction, or combinations thereof. The frame 100 may include suitable mating securement structures, such as apertures, adapted to receive the pins. In another example, the housing 316 may be coupled to the frame by welding, brazing, adhesives, or other suitable fastener elements.

In some examples, securement structures such as apertures may extend through a boss in a generally transverse direction 156c. In some embodiments one or more apertures may be through-apertures that extend from one transverse side of the boss to another, opposite transverse side of the boss. In some embodiments, one or more apertures may be blind apertures that extend into a boss, but not through to the other side. For example, the rearward boss 304 may include a mounting aperture 320 defined therethrough, the upper boss 312 may include a mounting aperture 318 defined therethrough, and/or the forward boss 306 may include a mounting aperture 314 defined therethrough. The mounting aperture 320 may be provided at alternate or additional locations within the rearward boss 304, such as shown by the mounting aperture 320'. For example, the mounting aperture 320' may be located in an upper portion 338, forward portion 344, lower portion 342, and/or a rearward portion 340 of the boss 304. For example, the aperture 320' may be located within one diameter of the aperture 320' of an external upper face 346 of the boss, within one diameter of the aperture 320' of a rear face 348 of the boss 304, and/or within one diameter of the aperture of a forward face 350 of the boss 304. In some examples, the aperture 320' may be within one diameter of the aperture 320' of the upper surface 330 of the housing 316. The mounting aperture 320' may be located independently of the aperture 320.

Providing alternate or additional locations of the mounting aperture 320/320' may enable the use of the motive power source 300 with different frames 100 and/or suspension linkages 114. Providing alternate or additional locations of the mounting aperture 320/320' may enable tuning of performance characteristics of the suspension linkage 114. Any of the mounting aperture 320, mounting aperture 318, and/or mounting aperture 314 may be adapted to receive an axle such as a fastener element like a bolt, pin, rivet, or the like to couple the respective boss to the suspended body 102 and/or the suspension linkage 114. The axle 170 and the respective mounting aperture may form a pivoted connection between the suspended body 102 and/or the suspension linkage 114 and the housing 316. For example, the mounting aperture 320 may form a pivoted joint that allows a portion of the suspension linkage 114 to pivot relative to the housing 316. In other examples, a mounting aperture may form a non-pivoting connection with the suspension linkage 114 and/or the suspended body 102. For example, the mounting aperture 314 and the upper boss 312 may form connections with the suspended body 102 that do not allow the motive power source 300 to pivot relative to the suspended body 102. The attachments of the motive power source 300 to the suspended body may be at discrete locations that are load bearing. For example, the securement structure 314, securement structure 320 and/or securement structure 318, may bear loads transmitted to the frame 100 and/or suspension linkage, such as loads imparted by the movement of the two-wheeled vehicle over the ground, and/or loads imparted by a rider. A benefit of such load bearing may be that the housing 316 may strengthen or stiffen the assembled frame 100 while not needing to add additional stiffeners, or the like.

The housing 316 may include one or more mounting points to mount the motive power source 300 to the frame 100 and/or the suspension linkage 114. For example, the housing 316 may include a rearward boss 304 extending away from the aft portion 310 of the housing 316. The housing 316 may include an upper portion 322 and a lower portion 324. The upper portion 322 and the lower portion 324 encompass part of front portion 308 and aft portion 310. The housing 316 includes opposing lateral sides 334 and 336. The housing 316 includes a front portion 326, rear portion 328, a top 330 side, and a bottom side 332. The rearward boss 304 may extend upwardly from the rear portion 328 or upwardly in the lateral direction 156b from the top side 330. The rearward boss 304 may extend rearwardly in the longitudinal direction 156a from the point at which the boss 304 attached to the top side 330. The rearward boss 304 may be located above the power interface 302. All, or a portion, of the rearward boss 304 may be located rearward of the power interface 302 in the longitudinal direction 156a. In some examples all, or a portion, of the rearward boss 304 may be located forward of the power interface 302 in the longitudinal direction 156a. In some examples, all or a portion, of the rearward boss 304 may be aligned in the longitudinal direction 156a (i.e., vertically aligned) with the power interface 302. The mounting aperture 320 may be located above the power interface 302. All, or a portion, of the mounting aperture 320 may be located rearward of the power interface 302 in the longitudinal direction 156a. In some examples all, or a portion, of the mounting aperture 320 may be located forward of the power interface 302 in the longitudinal direction 156a. In some examples all, or a portion, of the mounting aperture 320 may be aligned in the longitudinal direction 156a with the power interface 302. The power interface 302 may extend transversely from either or both of the opposing lateral sides 334, 336.

The motive power source 300 may include an upper boss 312 near the rearward boss 304. The upper boss 312 may extend forwardly in the longitudinal direction 156a from the point at which the boss 312 is attached to the top side 330. The upper boss 312 may be located above the power interface 302. All, or a portion, of the upper boss 312 may be located forward of the power interface 302 in the longitudinal direction 156a. All, or a portion, of the upper boss 312 may be located rearward of the power interface 302 in the longitudinal direction 156a. All, or a portion, of the upper boss 312 may be aligned in the longitudinal direction 156a with the power interface 302 (i.e., vertically aligned). The mounting aperture 318 may be located above the power interface 302. All, or a portion of, the mounting aperture 318 may be located forward of the power interface 302 in the longitudinal direction 156a. All, or a portion of, the mounting aperture 318 may be located rearward of the power interface 302 in the longitudinal direction 156a. All, or a portion, of the mounting aperture 314 may be aligned in the lateral direction 156b with the power interface 302 (i.e., horizontally aligned).

Likewise, the housing 316 may include a forward boss 306 extending away from the forward portion 308 of the housing 316. The forward boss 306 may extend forwardly in the longitudinal direction 156a from the point at which the boss 306 is attached to the front side 326 of the housing 316. The forward boss 306 may be located above the power interface 302 in the lateral direction 156b. All, or a portion, of the forward boss 306 may be located forward of the power interface 302 in the longitudinal direction 156a. All, or a portion, of the forward boss 306 may be aligned in the longitudinal direction 156a with the power interface 302 (i.e., vertically aligned). All, or a portion, of the forward boss 306 may be aligned in the lateral direction 156b with the power interface 302 (i.e., horizontally aligned). The mounting aperture 314 may be located above the power interface 302. All, or a portion, of the mounting aperture 314 may be located forward of the power interface 302 in the longitudinal direction 156a (i.e., vertically aligned). All, or a portion, of the mounting aperture 314 may be aligned in the lateral direction 156b with the power interface 302 (i.e., horizontally aligned).

FIG. 4A—FIG. 4D show views of an example of a bottom link 106a. The bottom link 106a has a body 142a. The bottom link 106a has transversely opposing plates 161a/b. Each plate 161a/b being generally L or V shaped and each defining a first portion 140a/b and a second portion 140c/d and a third portion 141a/b disposed between the respective first portions 140a/b and the respective second portions 140c/d. In some examples, the third portions 141a/are vertices between the respective first portions 104a/b and the respective second portions 140c/d. The transverse plates 161a/b are attached to one another by a connecting portion 166 extending between the third portions 141a/b and spacing the transverse plates 161a/b apart. A securement structure such as an aperture 164 is formed in the first lobe 140a/b of each plate 161a/b. The apertures 164 are aligned with each other. A securement structure such as an aperture 162 is formed in the second lobe 140c/d of each plate 161a/b. The apertures 162 are aligned with each other. A securement structure such as an aperture 160 is formed in the third portion 141a/b of each plate 161a/b. The apertures 160 are aligned with each other and run through the connection portion 166.

The body 142a includes a connection portion 166 extending in a transverse direction 156c between lobe 140a and lobe 140b disposed at opposite transverse ends of the connecting portion 166. The lobes 140a and 140b extend in lateral direction 156b from the connecting portion 166. The bottom link 106a includes lobes 140c and lobes 140d that extend in the longitudinal direction 156a from the connecting portion 166 at opposite transverse sides of the connecting portion 166. The bottom link 106a includes a first aperture 160 defined within, and extending through, the connecting portion 166. The bottom link 106a includes a second aperture 162 extending through both the lobe 140c and the lobe 140d. The bottom link 106a includes a third aperture 164 that extends through both the lobe 140a and the lobe 140b. Any of the first aperture 160, the second aperture 162, and/or the third aperture 164 may form a joint with any portion of the suspended body 102 and/or the suspension linkage 114. The ordinal descriptions (e.g., first, second, third) of the apertures 160, 162, and 164 are for clarity of description only and are not meant to be limiting in any way. For example, a bottom link may include a third aperture, but not a first or second, and so on. For example, the first aperture 160 may form a pivoted joint between the bottom link 106a and another part of the suspension linkage 114, such as the chain stay 108. The second aperture 162 may form a pivoted joint between the bottom link 106a and the suspended body 102. The third aperture 164 may form a pivoted joint between the bottom link 106a and the center link 112. When assembled to the frame 100 with the balance of the suspension linkage 114, the IVC[106][108] 130 may be located within the first aperture 160; the IVC[102][106] 128 may be located within the second aperture 162; and the IVC[106][112] 134 may be located within the third aperture 164. In some examples, the IVC[106][108] 130 is concentric with an axis of the first aperture 160. In some examples, the IVC[102][106] 128 is concentric with an axis of the second aperture 162. In some examples, the IVC[106][112] 134 is concentric with an axis of the third aperture 164.

Figure 5:
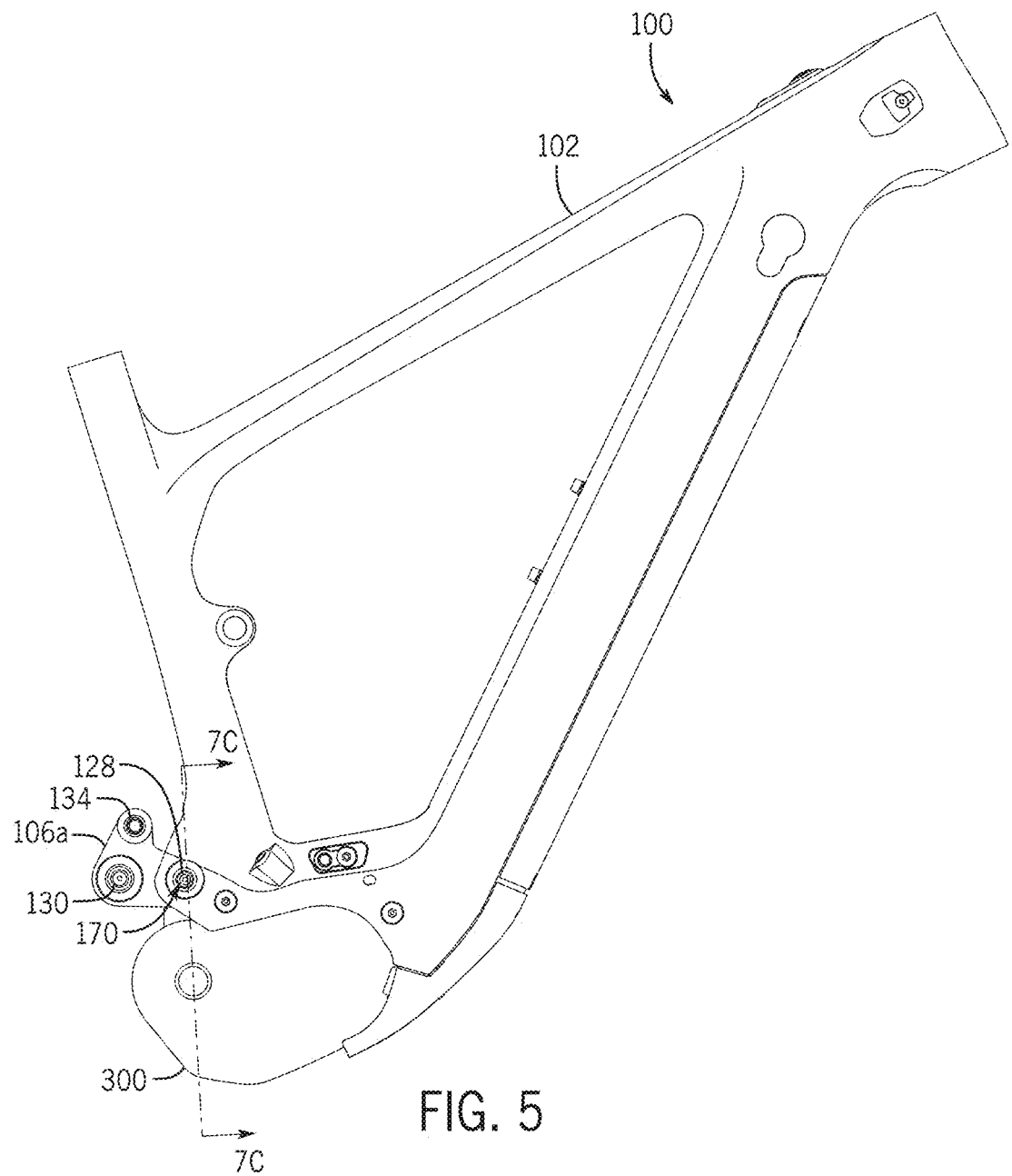
FIG. 5 is a partial side elevation view of the frame of FIG. 1.
Figure 6:
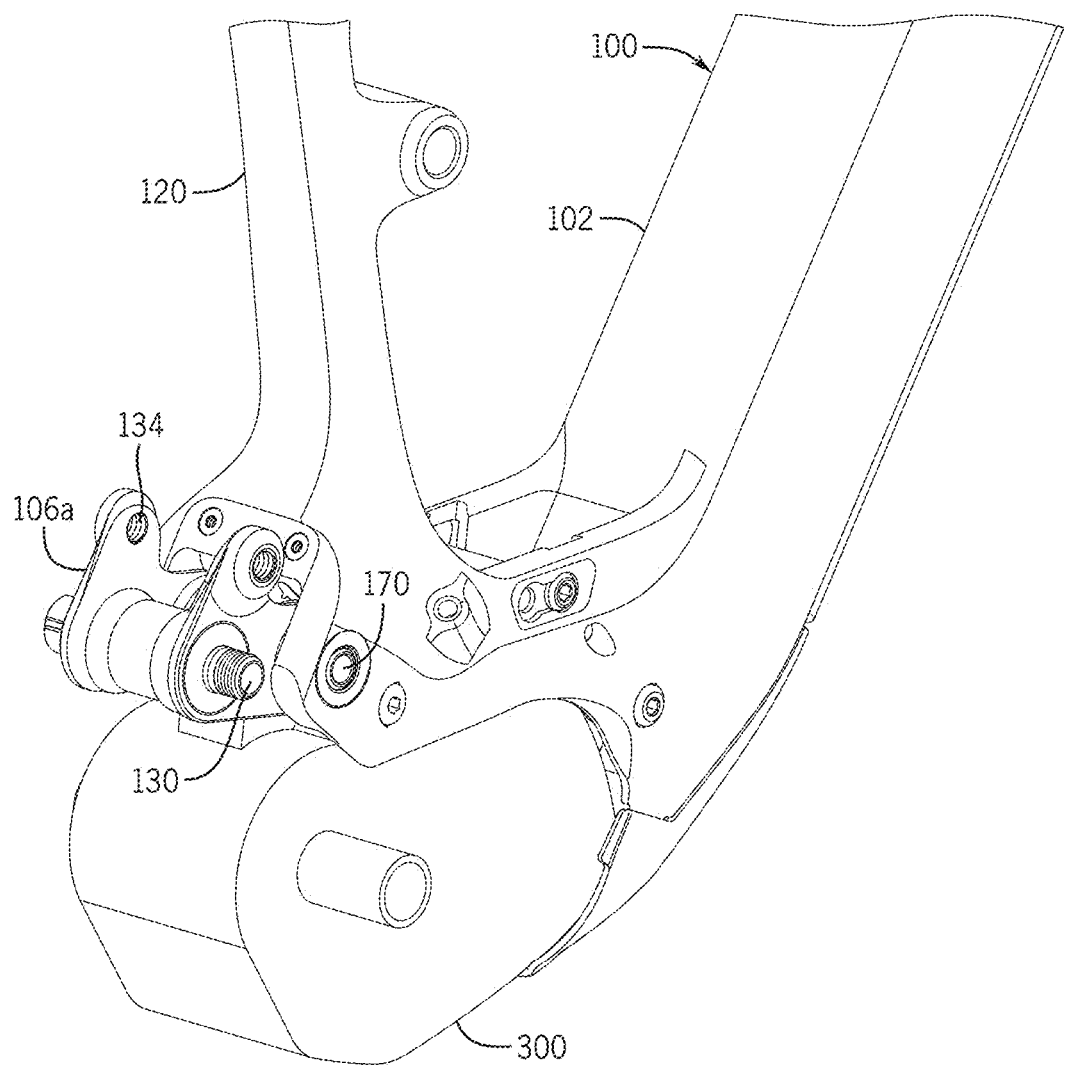
FIG. 6 is a partial detail isometric view of the frame of FIG. 1.
Figure 7A:
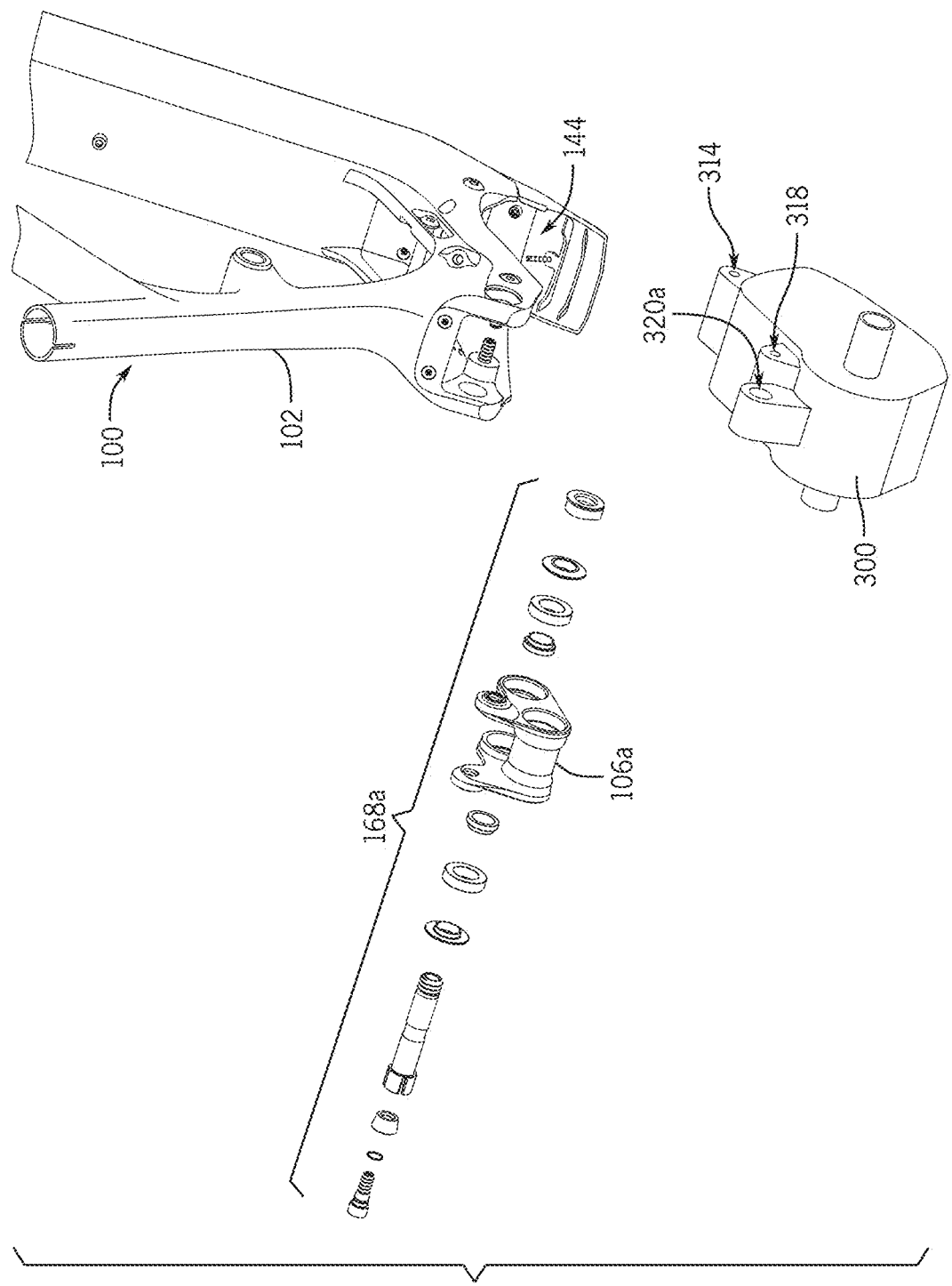
FIG. 7A is a partial exploded view of the frame of FIG. 1 with an embodiment of an axle assembly.
Figure 7B:
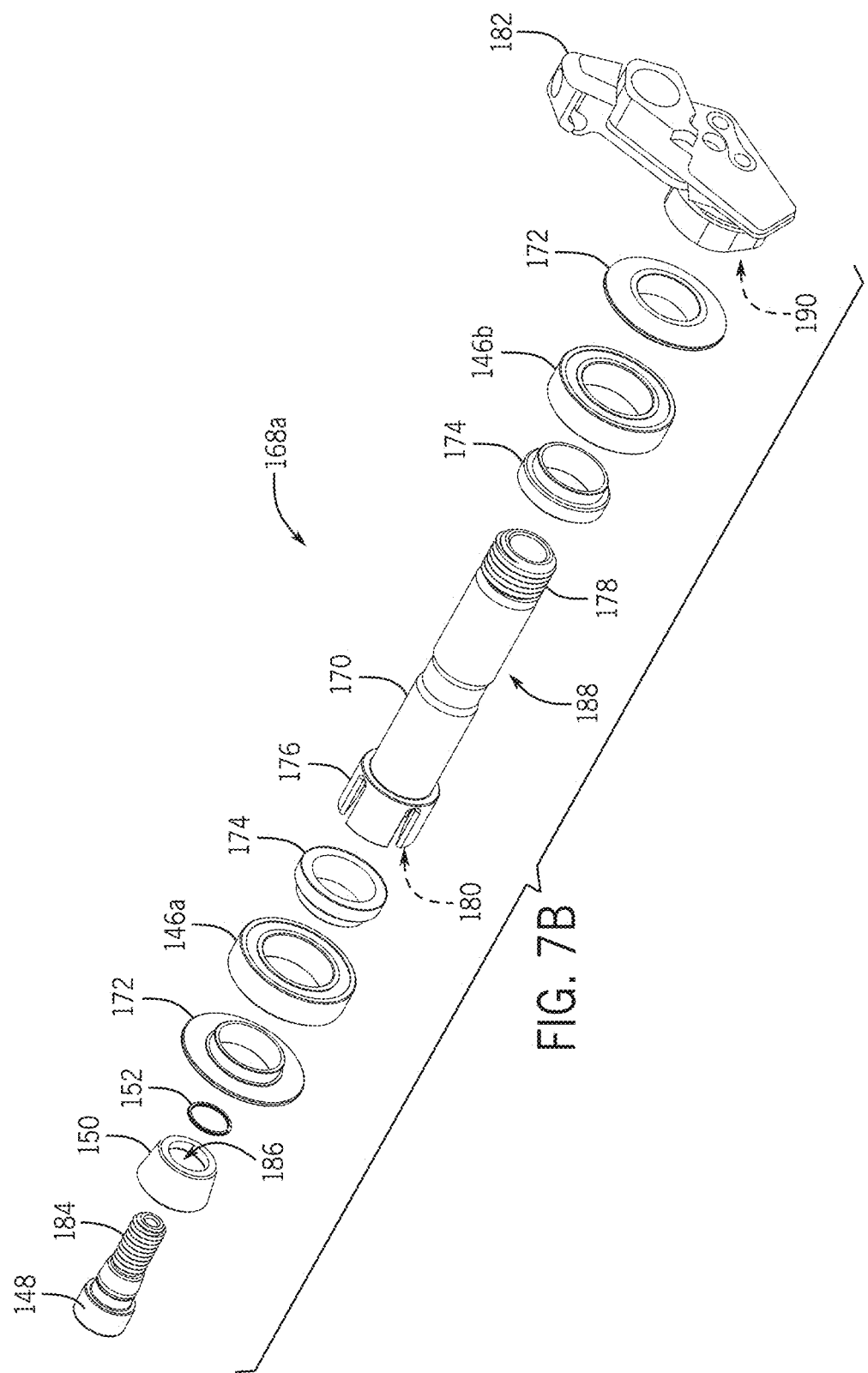
FIG. 7B is an exploded view of an axle assembly of the frame of FIG. 1.
Figure 7C:
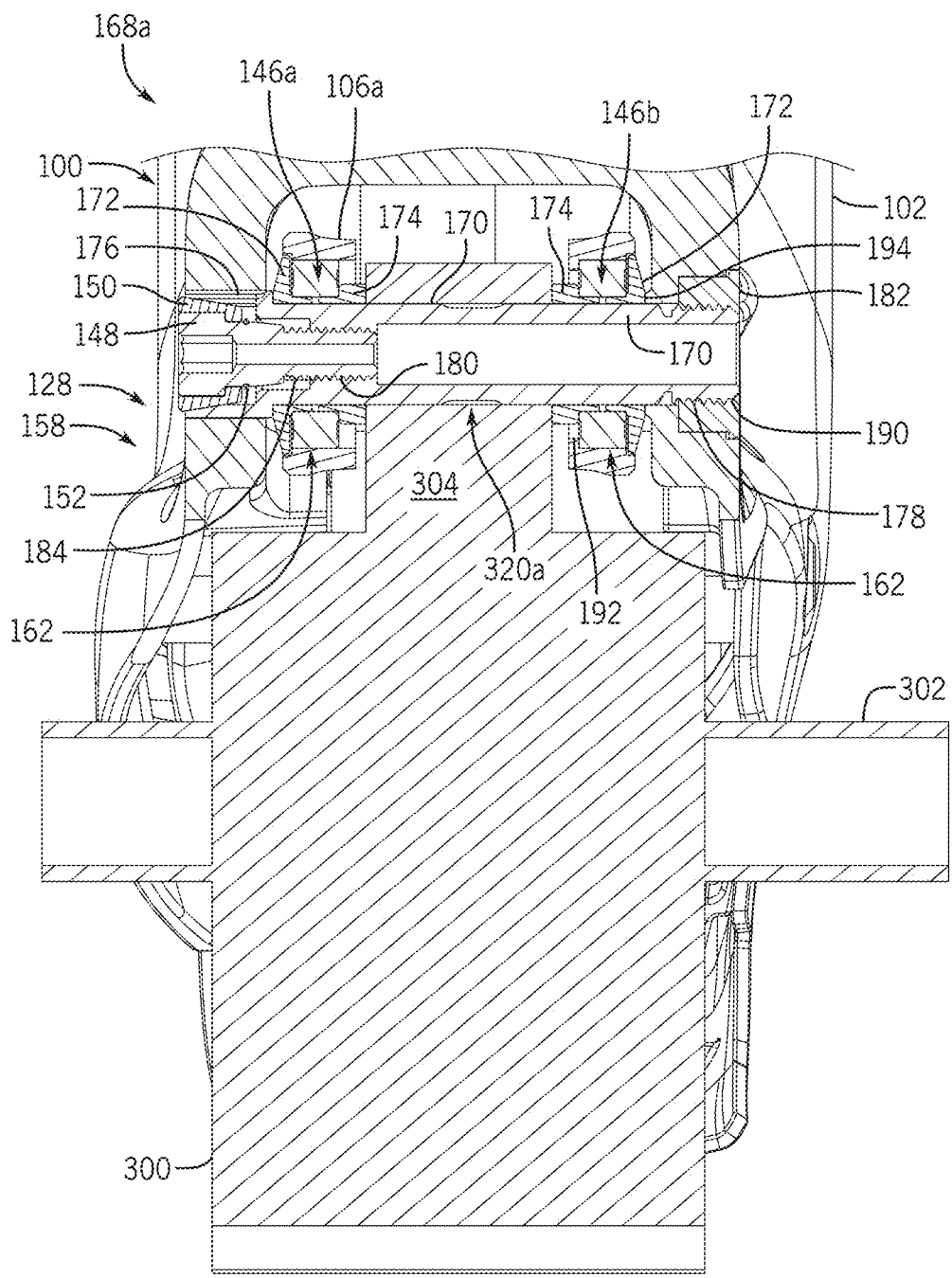
FIG. 7C is a partial section view of the frame of FIG. 1 taken along section line 7-7 of FIG. 5.

FIG. 5 is a partial side elevation view of the frame 100. FIG. 6 is a partial rear isometric view of the frame 100. FIG. 7A is a partial exploded rear isometric of the frame 100. FIG. 7B is an exploded view of the axle assembly 168*a* shown in FIG. 7A. FIG. 7C is a section through the motive power source 300 taken along section line 7-7 of FIG. 5. In FIG. 5-FIG. 8B, portions of the suspension linkage 114 are removed, for clarity. As shown for example in FIG. 5-FIG. 8B, the motive power source 300 may be coupled to the suspended body 102 via the second aperture 162 and the axle assembly 168*a* or 168*b*. Additionally or alternately, the motive power source 300 may be coupled to the suspension linkage 114 via the aperture 162. In some embodiments the motive power source 300 may be coupled to both the suspended body 102 and the suspension linkage 114.

As best shown in FIGS. 7A-7C, the motive power source 300 may be coupled to the suspended body 102 and the suspension linkage 114 by an axle assembly 168*a*. The axle assembly 168*a* may include a fastener element 148, a tapered collet 150, one or more outer race extenders 172, a retainer 152, one or more bearings 146*a/b*, an axle 170, and a cap 182.

The fastener element 148 may be a variety of types of fastener. In some examples, the fastener 148 is a socket head cap screw. The fastener 148 includes external helical fastener threads 184. The tapered collet 150 has an aperture 186 formed therein and adapted to receive the fastener 148. The aperture 186 is sufficiently large to allow a clearance with the fastener 148 such that the fastener threads 184 do not engage the tapered collet 150 at the aperture 186. The tapered collet 150 may be assembled with the fastener 148 and held to the fastener 148 with a retainer 152 such as a snap ring, spring, circlip, or the like. The retainer 152 may help withdraw the tapered collet 150 when disassembling the axle assembly 168*a*.

The axle 170 may have an elongate body 188 with an expandable portion 176 at one end of the elongate body 188 and external axle threads 178 at an opposite end of the elongate body 188. The axle 170 may include internal axle threads 180 in an end of the elongate body 188 near the expandable portion 176. The internal axle threads 180 (see, FIG. 7C) may be adapted to receive and mate with the fastener threads 184. The inside diameter of the expandable portion 176 may be the same size or less than an outer diameter of the tapered collet 150. The cap 182 may include internal cap threads 190 suitable to receive and mate with the external axle threads 178.

The bearings 146*a/b* may allow for rotational motion of the bottom link 106*a* with respect to the axle assembly 168*a*. For example, the bearings 146*a/b* may be roller bearings, tapered bearings, bushings, or the like. The bearings 146*a/b* may be adapted to receive the outer race extender 172 and inner race extender 174 on an inner race of the bearings 146*a/b*. The outer race extender 172 and inner race extender 174 may stabilize and/or locate the bearings in the axle assembly 168*a*. The outer race extenders 172 and inner race extenders 174 may fit inside the inner race of the bearing 146*a/b*, thereby effectively reducing the inner diameter of the bearings 146*a/b*. Such an axle assembly 168*a* may allow for installation of the race extenders to such that they do not fall out of the bottom link 106*a* during assembly.

As best shown in FIG. 7C, when assembled, the cap 182 may be secured to the suspended body 102 such as by the pulling force of the engagement of the external axle threads 178 with the internal cap threads 190, a press fit, or by other suitable structures. The bearing 146*a/b* and respective outer race extenders 172 and inner race extenders 174 may be assembled with the bottom link 106*a*, such as within the second aperture 162 of the bottom link 106*a*. Either of the bearings 146*a/b* may be floating or fixed along the axle 170. For example, the bottom link 106*a* may include a locating feature 192, such as a step, on a lobe 140*c/d* that limits movement of the bearing 146*b* in a transverse direction 156*c* along the axle 170. The bearing 146*a* may be allowed to move in the transverse direction 156*c* along the axle 170, such as when the respective lobe 140*c/d* does not include a locating feature 192.

Figure 8A:
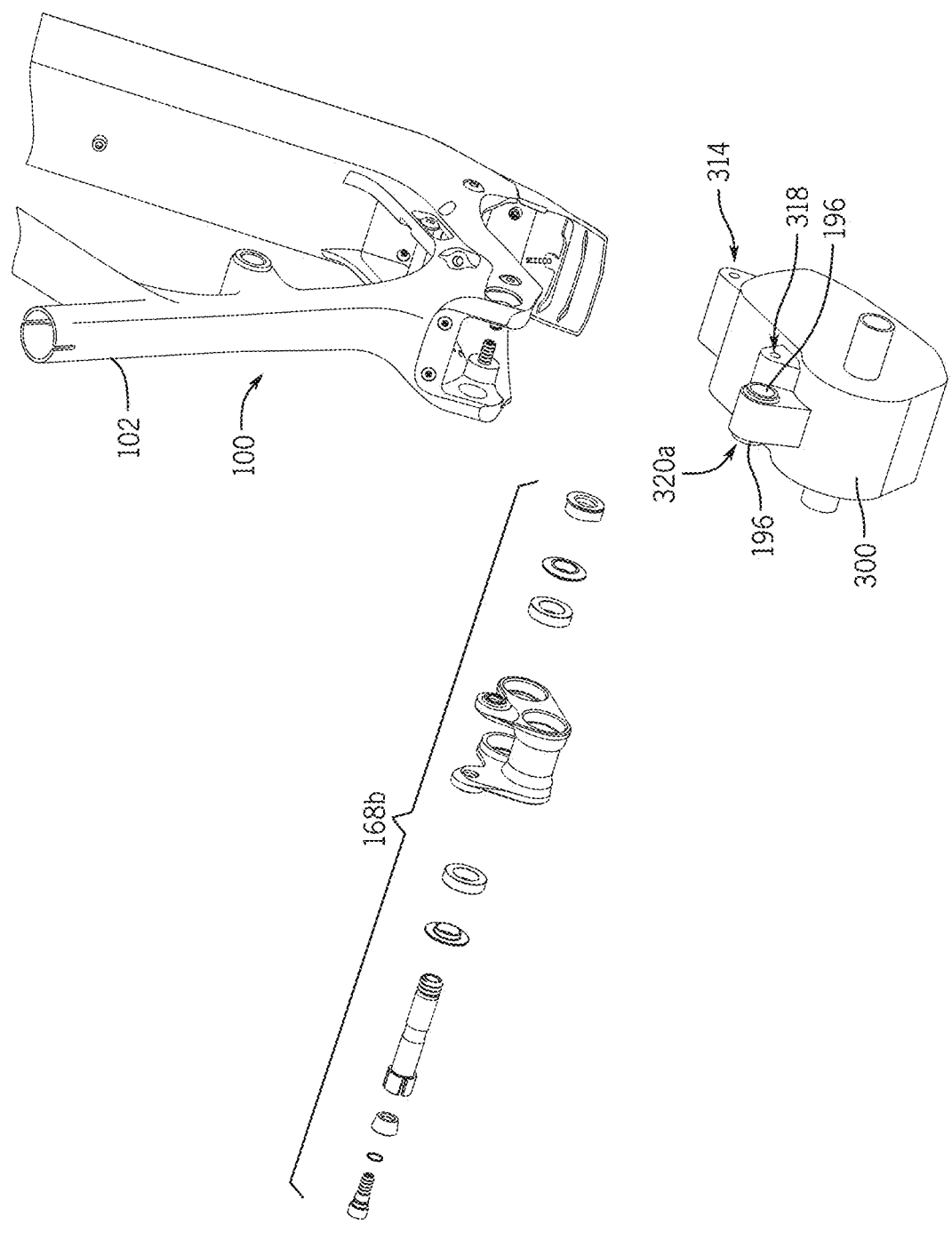
FIG. 8A is a partial exploded view of the frame of FIG. 1 with an embodiment of an axle assembly.
Figure 8B:
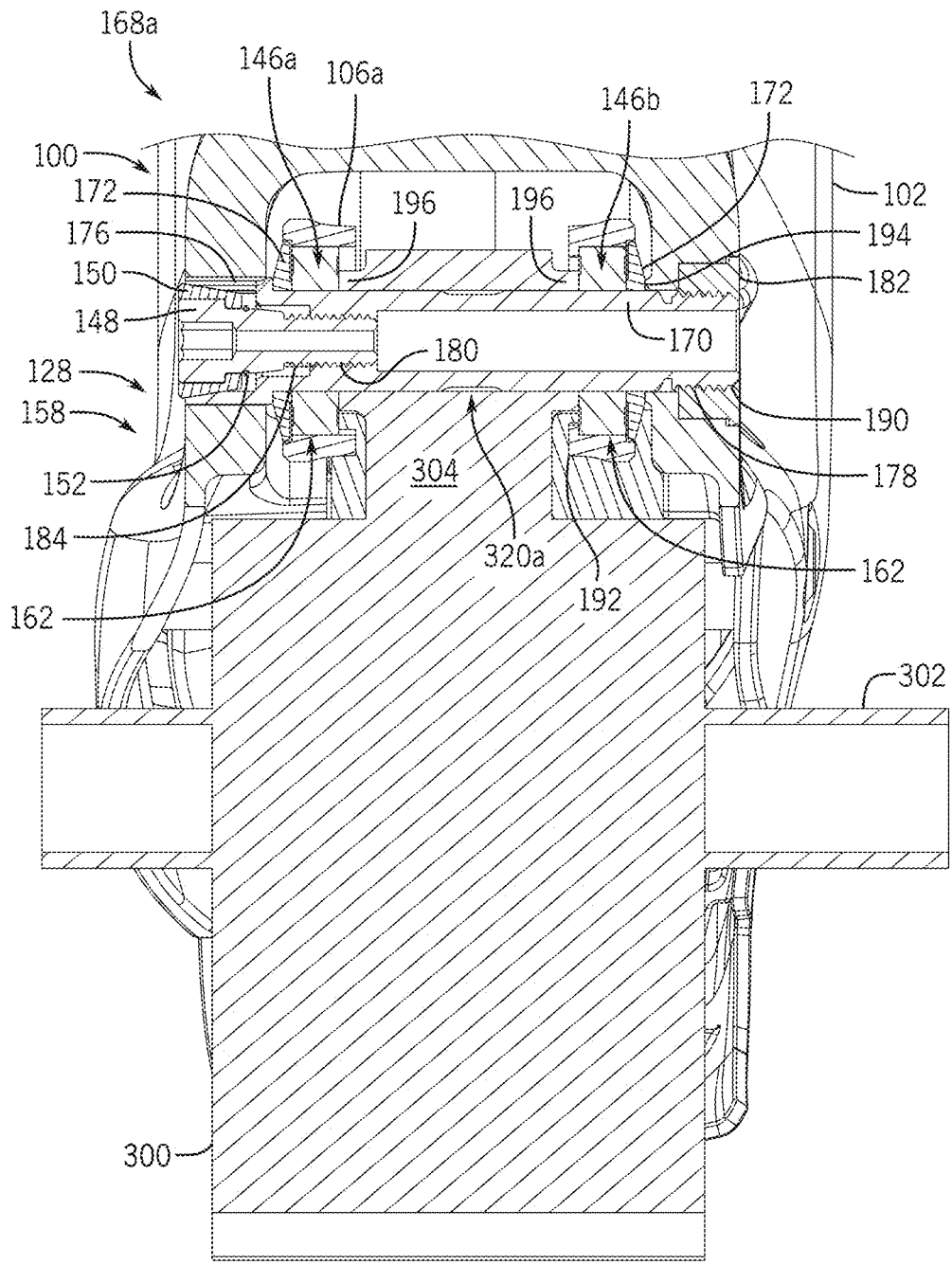
FIG. 8B is a partial section view of the frame of FIG. 8A taken along a similar section line to section line 7-7 of FIG. 5.
Figure 9:
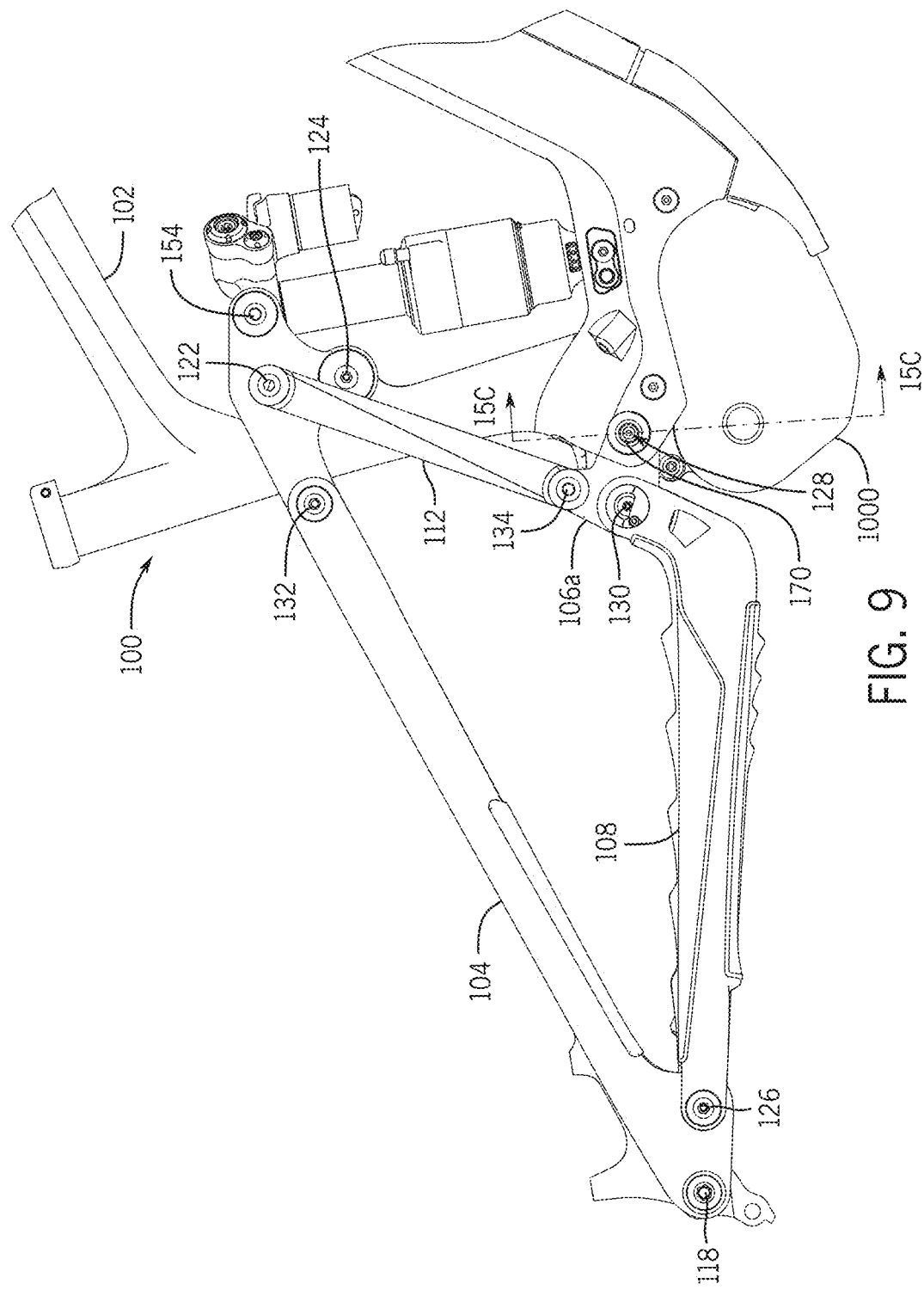
FIG. 9 is a partial side elevation view of the frame of FIG. 1 with an embodiment of a motive power source.

FIG. 8A and FIG. 8B show an alternate embodiment of an axle assembly 168*b* for use with the frame 100. As shown in FIG. 8A and FIG. 8B, an axle assembly 168*b* may be used that includes outer race extenders 172 that do not reduce the effective inner diameter of the bearings 146*a/b*. In such an assembly, inner race extender 174 may be omitted and locator bosses 196 included in a portion of the rearward boss of the motive power source 300. A notch in the bottom link 106*a* may be included to allow the bottom link 106*a* to be installed onto the rearward boss 304. Other aspects of the axle assembly 168*b* may be similar to those of axle assembly 168*a* and are not repeated, for brevity.

In either of the axle assemblies 168*a/b* in FIG. 7A—FIG. 8B, the axle 170 may be inserted into the suspended body aperture 158. The axle 170 may be extended through the bearings 146*a/b* and through the outer race extenders 172, inner race extenders 174 (if used), and/or locator bosses 196 (if used), which may be located within or adjacent to the second apertures 162. The axle 170 may be extended through the mounting aperture 320 in the rearward boss 304 of the motive power source 300. The axle 170 may be rotated such that the external axle threads 178 engage and mate with the internal cap threads 190. The axle 170 may be screwed into the internal cap threads 190 such that the axle 170 is located at a datum 194. The fastener 148 may be inserted through the aperture 186 in the tapered collet 150 and secured with the retainer 152. The fastener 148 and tapered collet 150 may be inserted into the expandable portion 176 of the axle 170. The fastener 148 may be rotated to engage the fastener threads 184 with the external axle threads 178. As the fastener 148 is drawn into the external axle threads 178, the tapered collet 150 presses against the expandable portion 176, expanding the expandable portion 176 such that the expandable portion 176 engages the inner wall of the suspended body aperture 158. The axle assembly 168*a/b* allows for a large tolerance discrepancy between the inner diameter of the suspended body aperture 158, and the outer diameter of the axle assembly 168*a/b*. The floating bearing 146*a* may force pre-load from the shock assembly 116 to the inner races of the bearings, as opposed to the bearings 146*a/b* themselves.

When assembled, the axle 170 may extend through the suspended body aperture 158 in the suspended body 102, through the second aperture 162 of the bottom link 106*a*, and through the mounting aperture 320 of the motive power source 300. In some embodiments the axle 170 may provide a concentric joint between the suspended body aperture 158, the second aperture 162 of the bottom link 106*a*, and/or the mounting aperture 320 of the motive power source 300. In some embodiments, the axle 170 may pass through the IVC[102][106] 128. In some embodiments, the axle 170 may be concentric with the IVC[102][106] 128.

Figure 10:
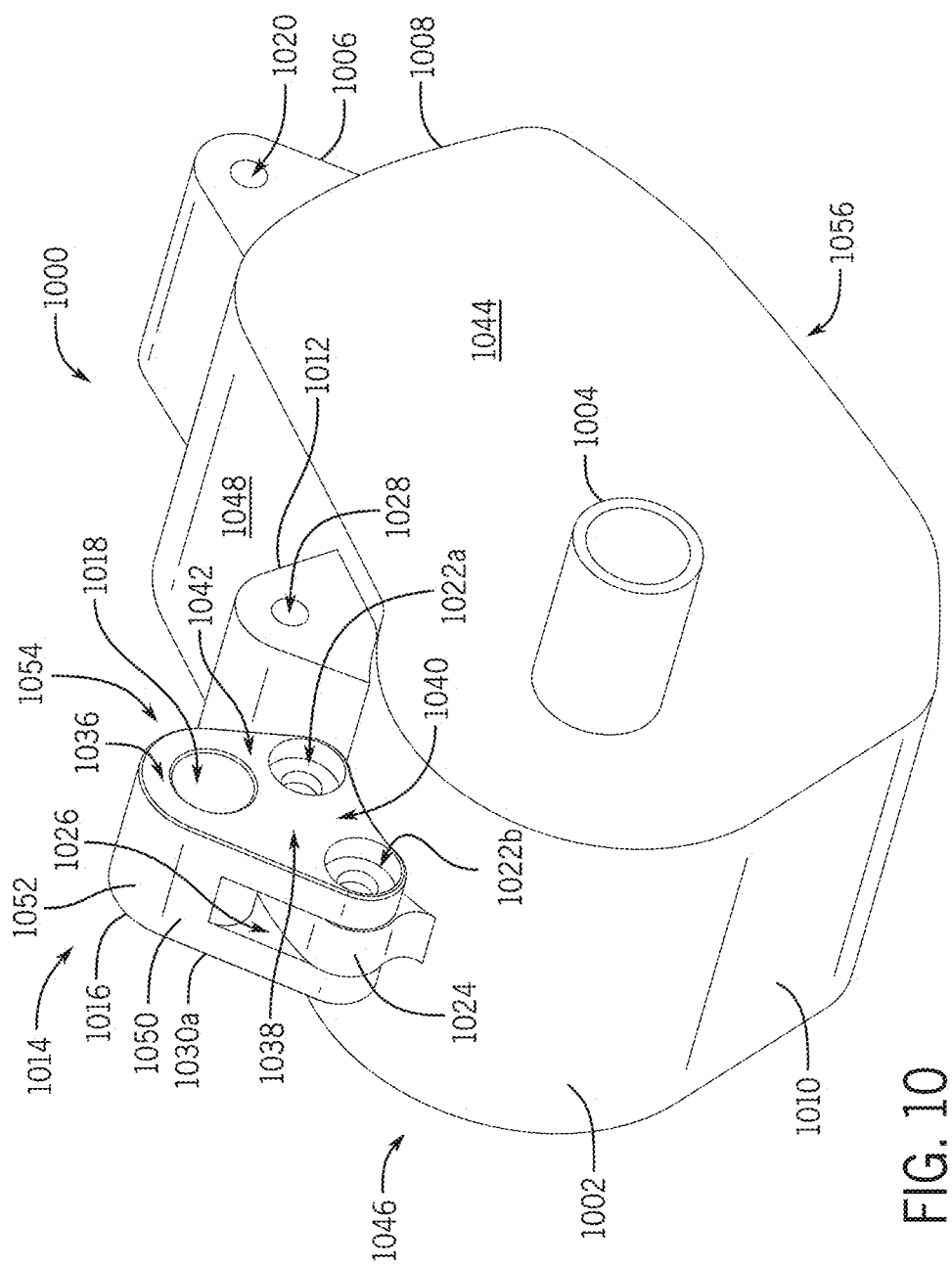
FIG. 10 is an isometric view of the motive power source of FIG. 9.

FIG. 9-FIG. 15C show another embodiment of a motive power source 1000 used with the axle assembly 168*a*. FIG. 10 is an isometric view of an embodiment of a motive power source 1000. The motive power source 1000 may include many similar features as the motive power source 300, which are not repeated for the sake of brevity. The motive power source 1000 may be an electric motor, an internal combustion engine, a transmission, and/or a combination thereof. The motive power source 1000 includes a housing 1002 that contains the internal components of the motive power source 1000. In some implementations, the housing 1002 may be a load-bearing member that supports loads imparted to the frame 100 and/or suspension linkage 114 such as when the e-bike is ridden, pedaled, or propelled by the motive power source 1000. The housing 1002 may include an aft portion 1010 and a forward portion 1008 located relative to one another along the longitudinal direction 156*a*. The housing 1002 may include one or more mounting points to mount the motive power source 1000 to the frame 100 and/or the suspension linkage 114. The housing 1002 may include a forward boss 1006 extending away from the forward portion 1008 of the housing 1002. The motive power source 1000 may include an upper boss 1012.

The attachments of the motive power source 1000 to the suspended body may be at discrete locations that are load bearing. For example, securement structures 1018, securement structure 1020 and/or securement structure 1028, may bear loads transmitted to the frame 100 and/or suspension linkage 314, such as loads imparted by the movement of the two-wheeled vehicle over the ground, and/or loads imparted by a rider. A benefit of such load bearing may be that the housing 1002 may strengthen or stiffen the assembled frame 100 while not needing to add additional stiffeners, or the like.

The housing 1002 may include, and/or be selectively couplable to, one or more mounting points to mount the motive power source 1000 to the frame 100 and/or the suspension linkage 114. For example, the housing 1002 may include a removable rearward boss 1014 extending away from the aft portion 1010 of the housing 1002. The housing 1002 may include an upper portion 1048 and a lower portion 1060. The upper portion 1048 and the lower portion 1060 encompass part of front portion 1008 and aft portion 1010. The housing 1002 includes opposing lateral sides 1044 and 1046. The housing 1002 includes a front portion 1008, rear portion 1502, a top 1048 side, and a bottom side 1060. The rearward boss 1014 may extend upwardly from the rear portion 1010 or upwardly in the lateral direction 156*b* from the top side 1048. The rearward boss 1014 may extend rearwardly in the longitudinal direction 156*a* from the point at which the boss 1014 attached to the top side 1048. The rearward boss 1014 may be located above the power interface 1004. All, or a portion, of the rearward boss 1014 may be located rearward of the power interface 1004 in the longitudinal direction 156*a*. In some examples all, or a portion, of the rearward boss 1014 may be located forward of the power interface 1004 in the longitudinal direction 156*a*. In some examples, all or a portion, of the rearward boss 1014 may be aligned in the longitudinal direction 156*a* (i.e., vertically aligned) with the power interface 1004. The mounting aperture 1018 may be located above the power interface 1004. All, or a portion, of the mounting aperture 1018 may be located rearward of the power interface 1004 in the longitudinal direction 156*a*. In some examples all, or a portion, of the mounting aperture 1018 may be located forward of the power interface 302 in the longitudinal direction 156*a*. In some examples all, or a portion, of the mounting aperture 1018 may be aligned in the longitudinal direction 156*a* with the power interface 1004. The power interface 1004 may extend transversely from either or both of the opposing lateral sides 1044, 1046.

The motive power source 1000 may include an upper boss 1012 near the rearward boss 304. The upper boss 1012 may extend forwardly in the longitudinal direction 156*a* from the point at which the boss 1012 is attached to the top side 1048. The upper boss 1012 may be located above the power interface 1004. All, or a portion, of the upper boss 1012 may be located forward of the power interface 1004 in the longitudinal direction 156*a*. All, or a portion, of the upper boss 1012 may be located rearward of the power interface 1004 in the longitudinal direction 156*a*. All, or a portion, of the upper boss 1012 may be aligned in the longitudinal direction 156*a* with the power interface 1004 (i.e., vertically aligned). The mounting aperture 1028 may be located above the power interface 1004. All, or a portion of, the mounting aperture 1028 may be located forward of the power interface 1004 in the longitudinal direction 156*a*. All, or a portion of, the mounting aperture 1028 may be located rearward of the power interface 1004 in the longitudinal direction 156*a*. All, or a portion, of the mounting aperture 1028 may be aligned in the lateral direction 156*b* with the power interface 1004 (i.e., horizontally aligned).

Likewise, the housing 1002 may include a forward boss 1006 extending away from the forward portion 1008 of the housing 1002. The forward boss 1006 may extend forwardly in the longitudinal direction 156*a* from the point at which the boss 1006 is attached to the front side 1008 of the housing 1002. The forward boss 1006 may be located above the power interface 1004 in the lateral direction 156*b*. All, or a portion, of the forward boss 1006 may be located forward of the power interface 1004 in the longitudinal direction 156*a*. All, or a portion, of the forward boss 1006 may be aligned in the longitudinal direction 156*a* with the power interface 1004 (i.e., vertically aligned). All, or a portion, of the forward boss 1006 may be aligned in the lateral direction 156*b* with the power interface 1004 (i.e., horizontally aligned). The mounting aperture 1020 may be located above the power interface 1004. All, or a portion, of the mounting aperture 1020 may be located forward of the power interface 1004 in the longitudinal direction 156*a* (i.e., vertically aligned). All, or a portion, of the mounting aperture 1020 may be aligned in the lateral direction 156*b* with the power interface 1004 (i.e., horizontally aligned).

The aperture 1018 may be located in an upper portion 1036, forward portion 1042, lower portion 1040, and/or a rearward portion 1038 of the boss 1014. For example, the aperture 1018 may be located within one diameter of the aperture 1018 of an external upper face 1052 of the boss 1014, within one diameter of the aperture 1018 of a rear face 1050 of the boss 1014, and/or within one diameter of the aperture of a forward face 1054 of the boss 1014. In some examples, the aperture 1018 may be within one diameter of the aperture 1018 of the upper surface 1052 of the housing 1002.

The housing 1002 of the motive power source 1000 may include one or more removable bosses. For example, the motive power source 1000 may include a protrusion 1024 configured to couple to one or more boss extensions 1030*a/b*. The protrusion 1024 may have one or more apertures defined therethrough, such as the apertures 1032*a/b*. When coupled to the protrusion 1024, the protrusion 1024 and the boss extensions 1030a/b may form a rearward boss 1014 similar in structure and function to the rearward boss 304. The rearward boss 1014 may extend away and rearward from the aft portion 1010 of the housing 1002.

Figure 11:
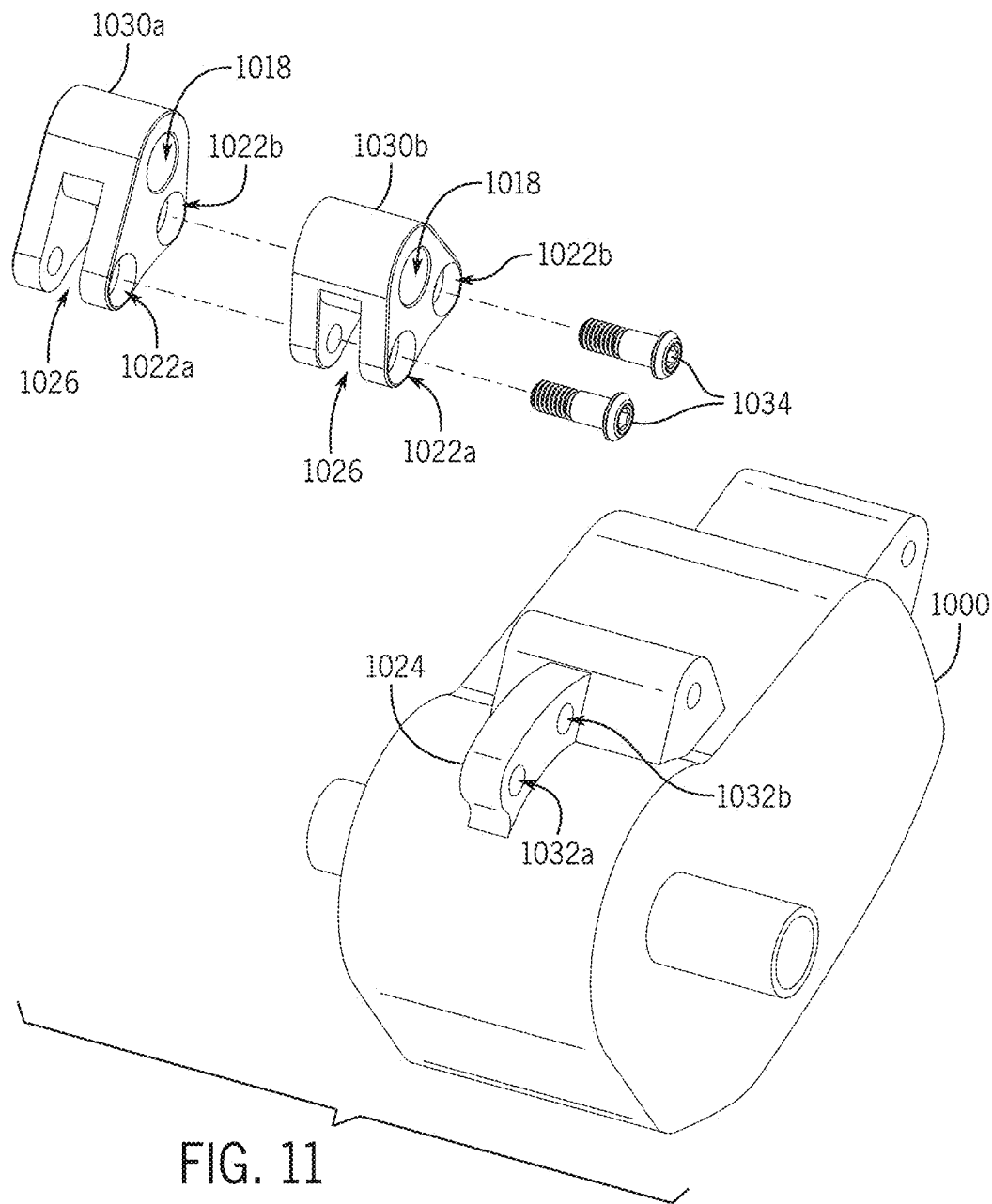
FIG. 11 is a partially exploded view of the motive power source of FIG. 9.
Figure 12:
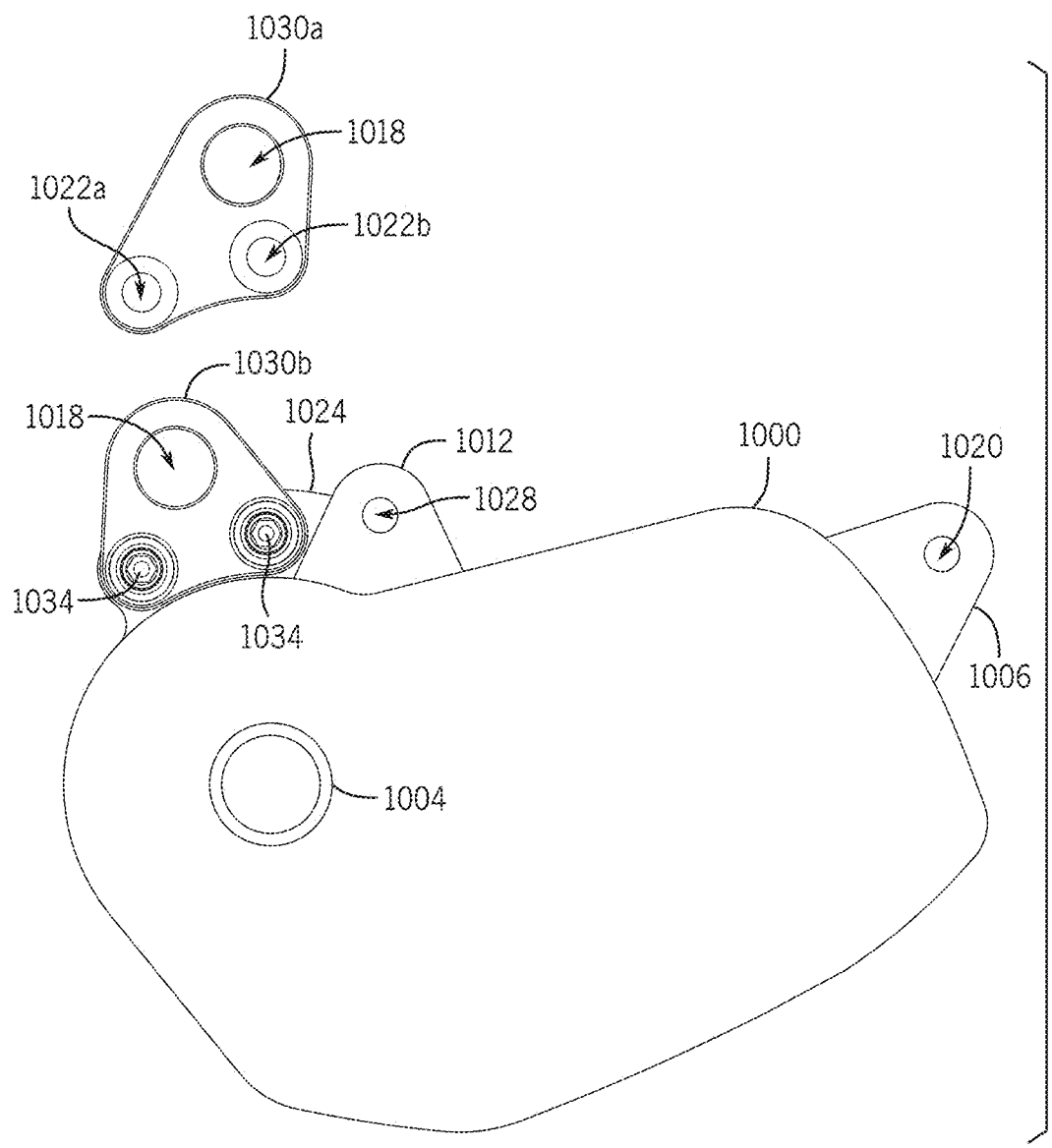
FIG. 12 is a side elevation view of the motive power source of FIG. 9.
Figure 13:
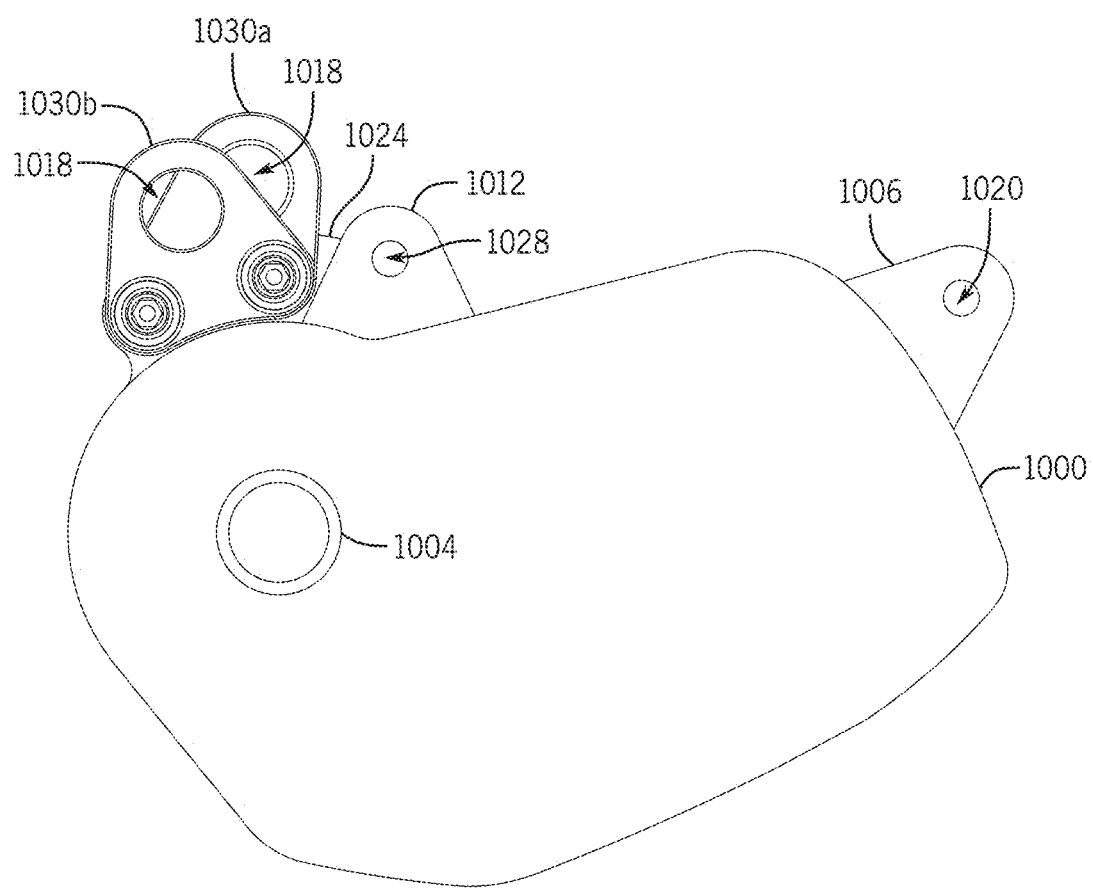
FIG. 13 is a side elevation view of the motive power source of FIG. 9 in alternate configurations.
Figure 14:
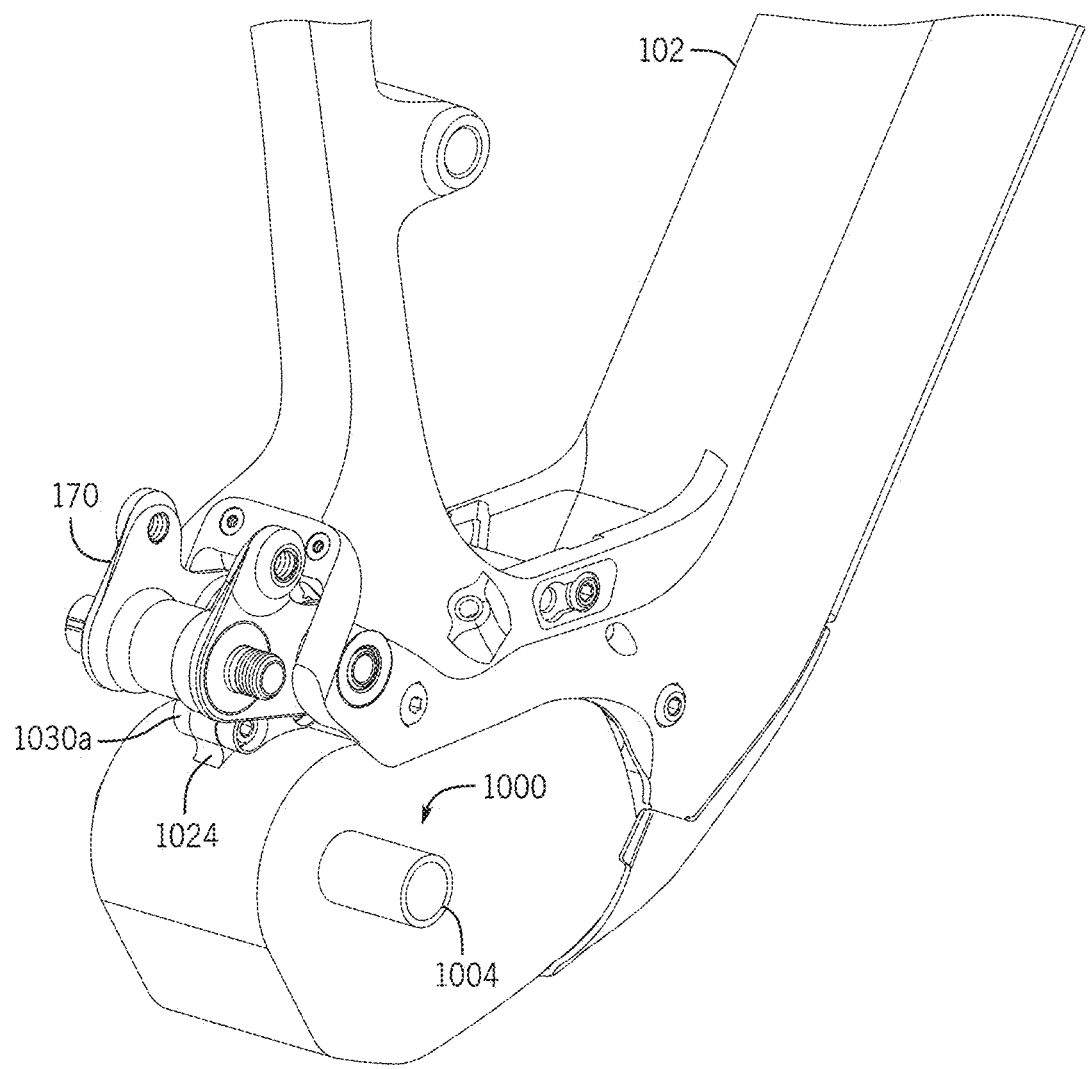
FIG. 14 is a partial detail isometric view of the frame of FIG. 9 with the motive power source of FIG. 9.

As shown for example in FIG. 11, one or more boss extensions 1030 may be provided. The boss extension 1030a and/or 1030b may have a boss extension body 1016. The boss extension body 1016 may have a mounting aperture 1018 defined therethrough. The mounting aperture 1018 may be similar in structure, location, and function to the mounting aperture 320 of the motive power source 300 previously described. The boss extension body 1016 may have a receptacle 1026 defined therein and adapted to receive a protrusion of the motive power source 1000, such as the protrusion 1024. The receptacle 1026 may include one or more mounting apertures such as the mounting apertures 1022a/b. The mounting apertures 1022a/b may be adapted to align with the respective apertures 1032a/b of the protrusion 1024. One or more fastener elements 1034 may secure the boss extension body 1016 to the housing 1002 via the respective mounting apertures 1022a/b and apertures 1032a/b. The alignment of the mounting apertures 1022a/b with the apertures 1032a/b may position the boss extension body 1016 relative to the motive power source 1000, the suspended body 102, and/or the suspension linkage 114. When assembled, the axle 170 of an axle assembly, such as the axle assemblies 168a/b may extend through the suspended body aperture 158, the second aperture 162 of the bottom link 106a/b, and the mounting aperture 1018 to form a jointed connection. The IVC[102][106] 128 may be located within the jointed connection formed by the axle 170, the suspended body aperture 158, the second aperture 162, and the mounting aperture 1018. In some examples, the alignment of the mounting apertures 1022a/b with the apertures 1032a/b may position the mounting aperture 1018 to be concentric with the suspended body aperture 158 and/or the second aperture 162 of the bottom link 106a/b.

A benefit of providing a removable boss such as with the motive power source 1000 may include the ability to use a common motive power source 1000 with different suspended bodies 102 and/or suspension linkages 114, or to change performance characteristics of the suspension linkage 114. As shown for example, in FIGS. 12 and 13, different boss extensions may provide for different locations of the mounting aperture 1018 relative to the motive power source 1000 or the suspended body 102. Moving the location of the mounting aperture 1018 may move the location of the IVC[102][106] 128 relative to the other IVCs of the suspension linkage 114. Some locations of the IVC[102][106] 128 may be suited for one type of suspended body 102 and/or suspension linkage 114, while other locations of the IVC[102][106] 128 may be provided for another suspended body 102 and/or suspension linkage 114, while using the same motive power source 1000. In another example, the boss extensions 1030a/b may provide for adjustment of suspension characteristics of the suspension linkage 114, for example by moving the location of the IVC[102][106] 128 of a given suspension linkage 114 and/or suspended body 102. For example, the boss extension 1030a may be associated with one location of the IVC[102][106] 128 and a corresponding type of performance for the suspension linkage 114, whereas another boss extension 1030b and another location of the IVC[102][106] 128 may be associated with another type of performance for the suspension linkage 114. For example, the boss extension 1030a may be suited to configure the two-wheeled vehicle to climb a grade, whereas the boss extension 1030b may be suited to configure the two-wheeled vehicle to descend a grade. In other examples, the locations of the IVC[102][106] 128 may change the anti-squat and/or anti-rise behavior of the suspension linkage 114. In some cases, it may be economical for the same motive power source to be used on several different two-wheeled vehicles with varying designs. To accommodate these varying packaging constraints, while maintaining suspension linkage performance such as anti-squat and/or anti-rise, the motive power source may be rotated, as an example, about an axis parallel to transverse direction 156c, or shifted in the lateral direction 156b, the longitudinal direction 156a or the transverse direction 156c. The protrusion 1024 may be shifted accordingly. The boss extensions 1030a/b may provide for adjustment of suspension characteristics of the suspension linkage 114, for example by maintaining a similar relationship of the location of the IVC[102][106] 128 of a given suspension linkage 114 and/or suspended body 102, and the driven wheel axis 118 despite the position change of the motive power source 1000. Adjustability of mounting aperture 1018 may also provide for clearance to suspended bodies or two-wheel vehicle components.

Figure 15A:
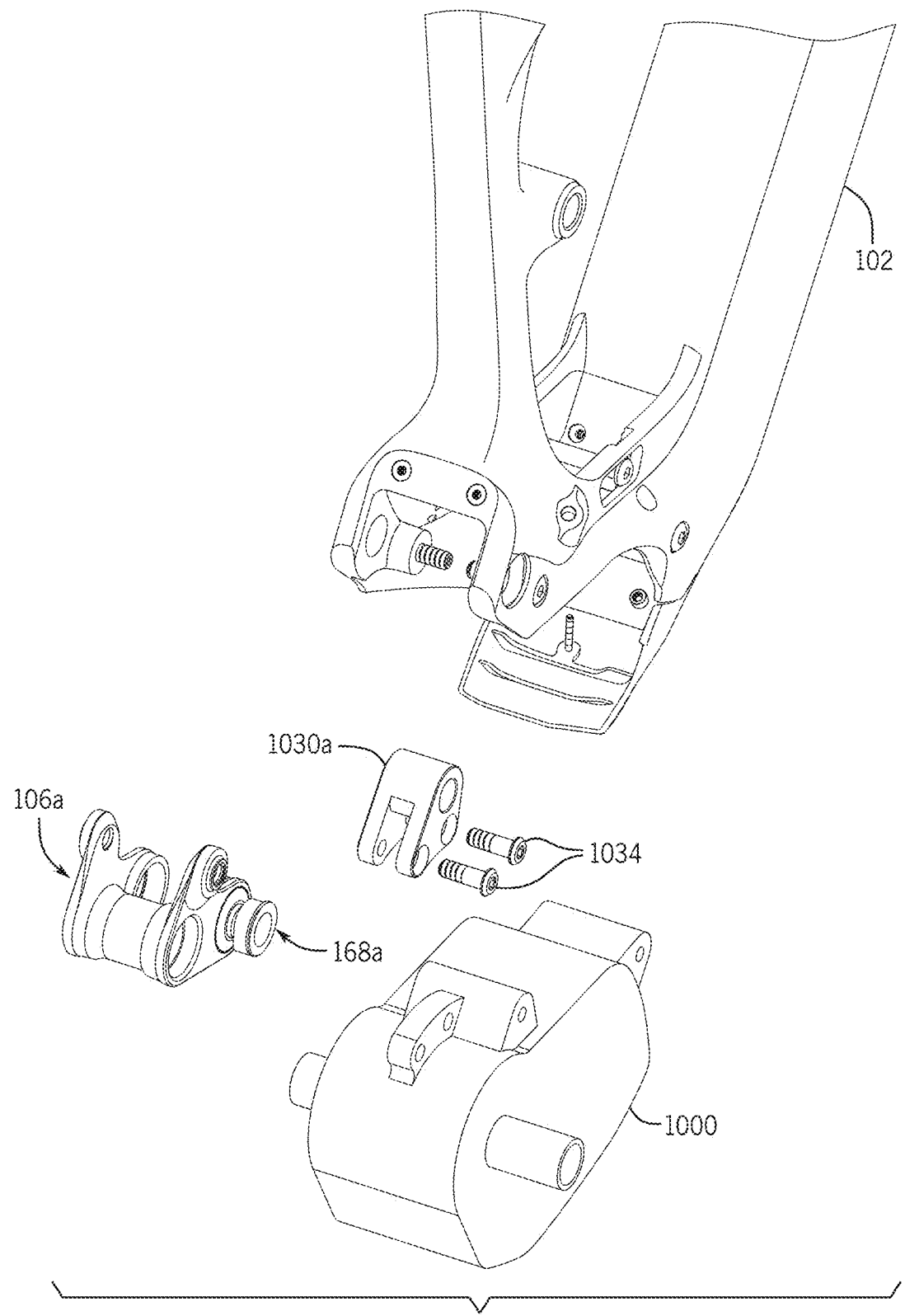
FIG. 15A is a partial isometric view of the frame of FIG. 1 with the motive power source of FIG. 9 and an embodiment of an axle assembly.
Figure 15B:
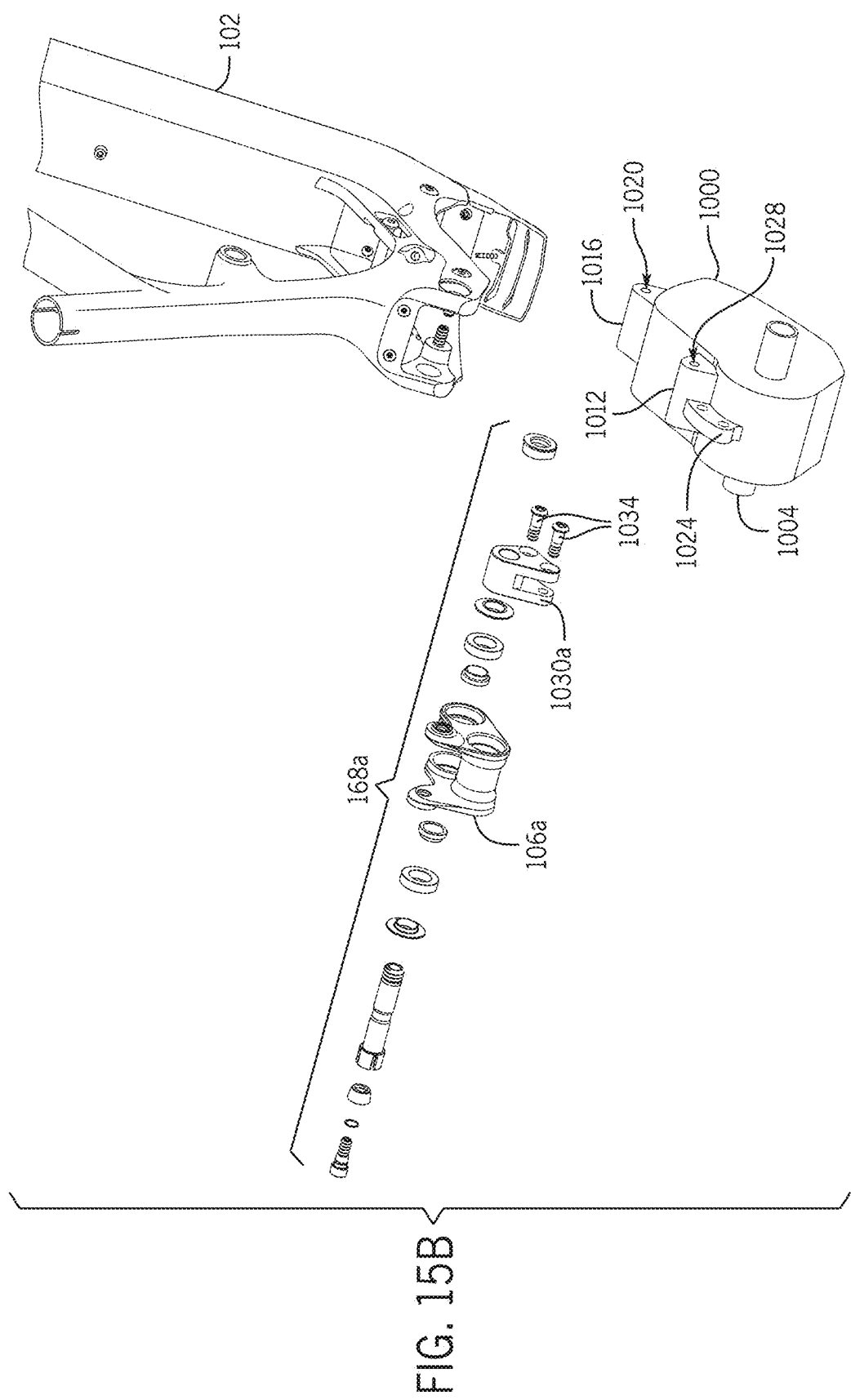
FIG. 15B is a partial exploded view of FIG. 15A.
Figure 15C:
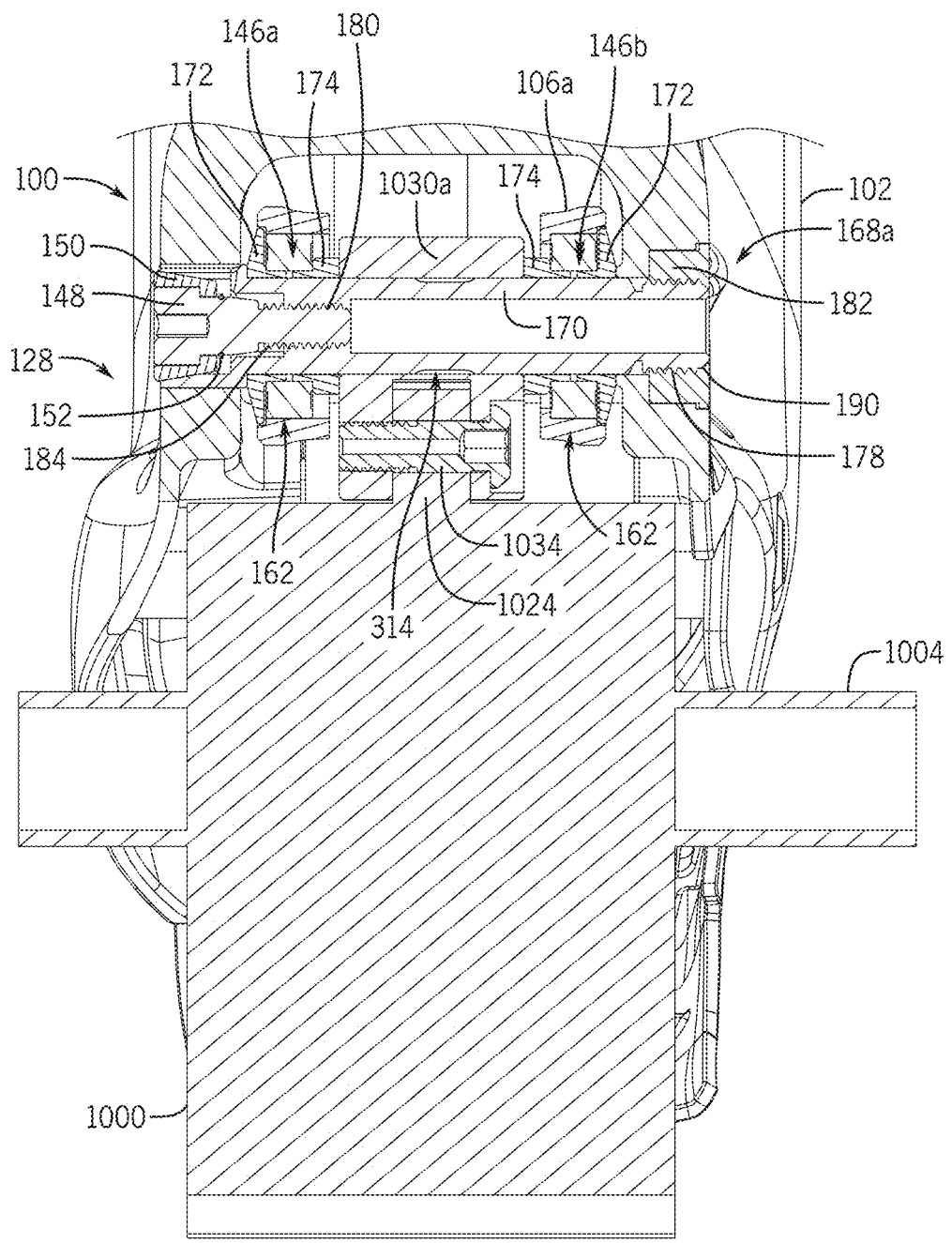
FIG. 15C is a partial section view of the frame of FIG. 9 taken along section line 15-15 of FIG. 9.

FIG. 15A-FIG. 15C show an example of the motive power source 1000 used with the axle assembly 168a as previously described. The axle assembly 168a may have a similar function and structure when used with the motive power source 1000 as when used with the motive power source 300, which is not repeated, for brevity.

Figure 16A:
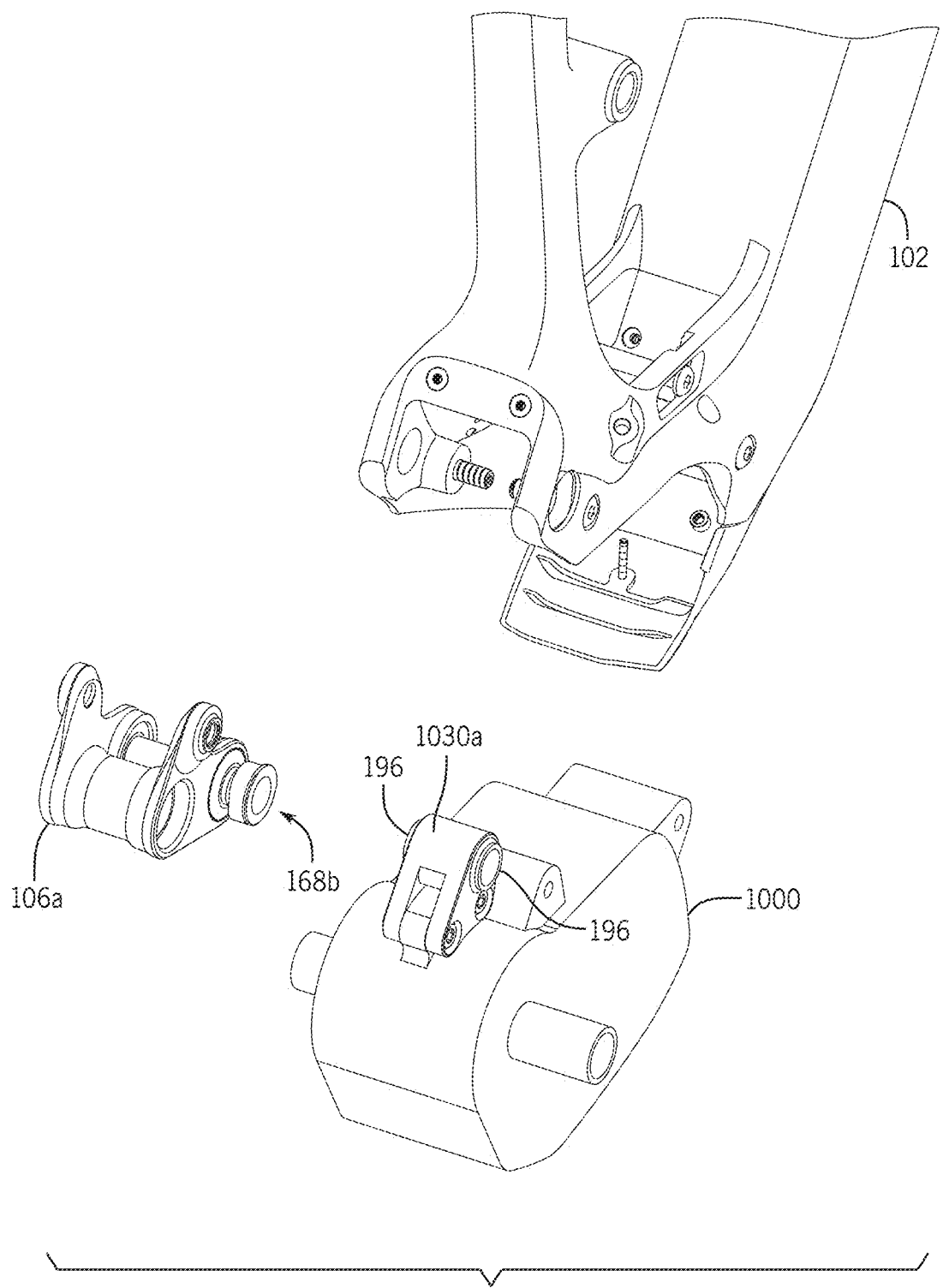
FIG. 16A is a partial isometric view of the frame of FIG. 1 with the motive power source of FIG. 9 and an embodiment of an axle assembly.
Figure 16B:
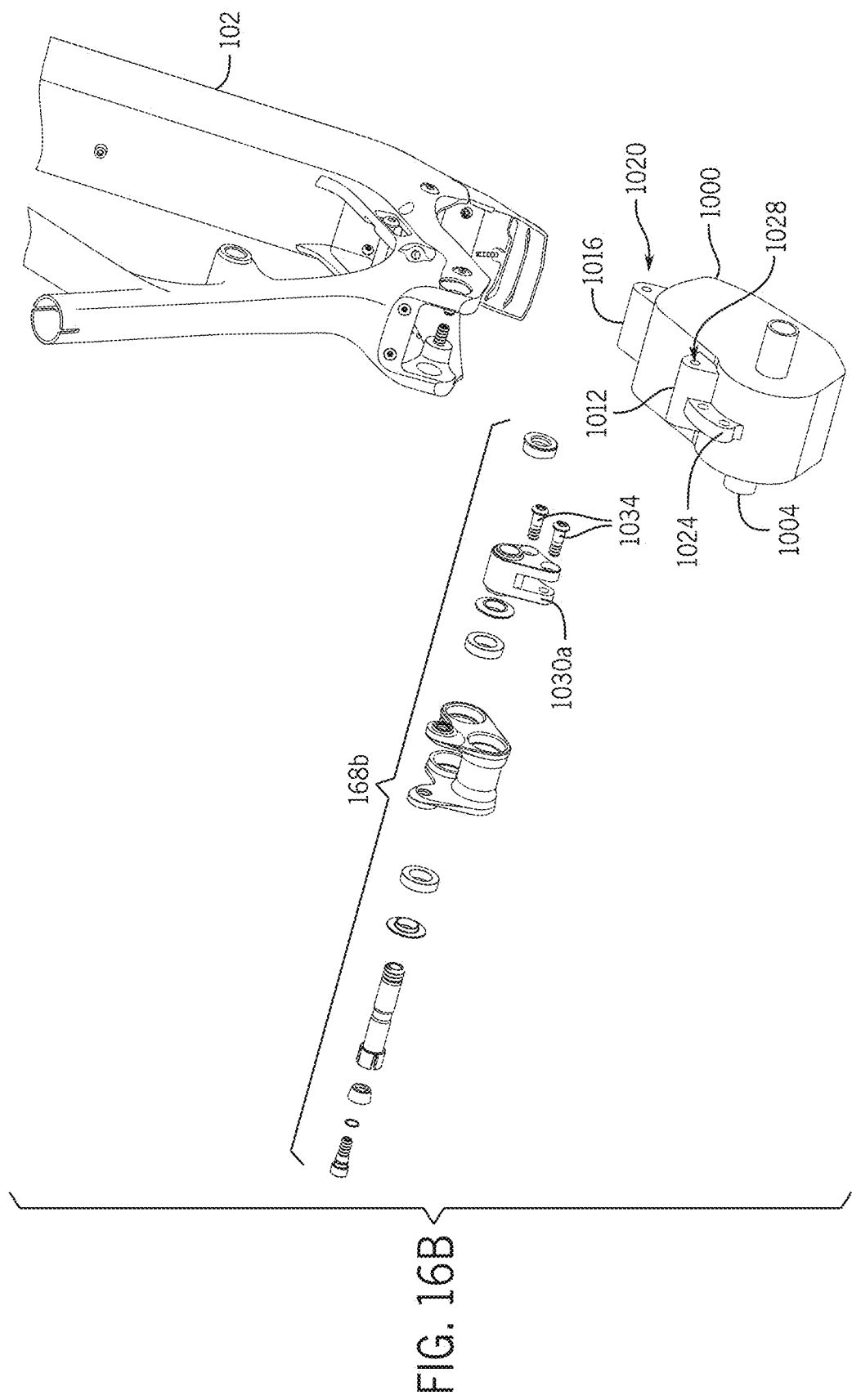
FIG. 16B is a partial exploded view of FIG. 16A.
Figure 16C:
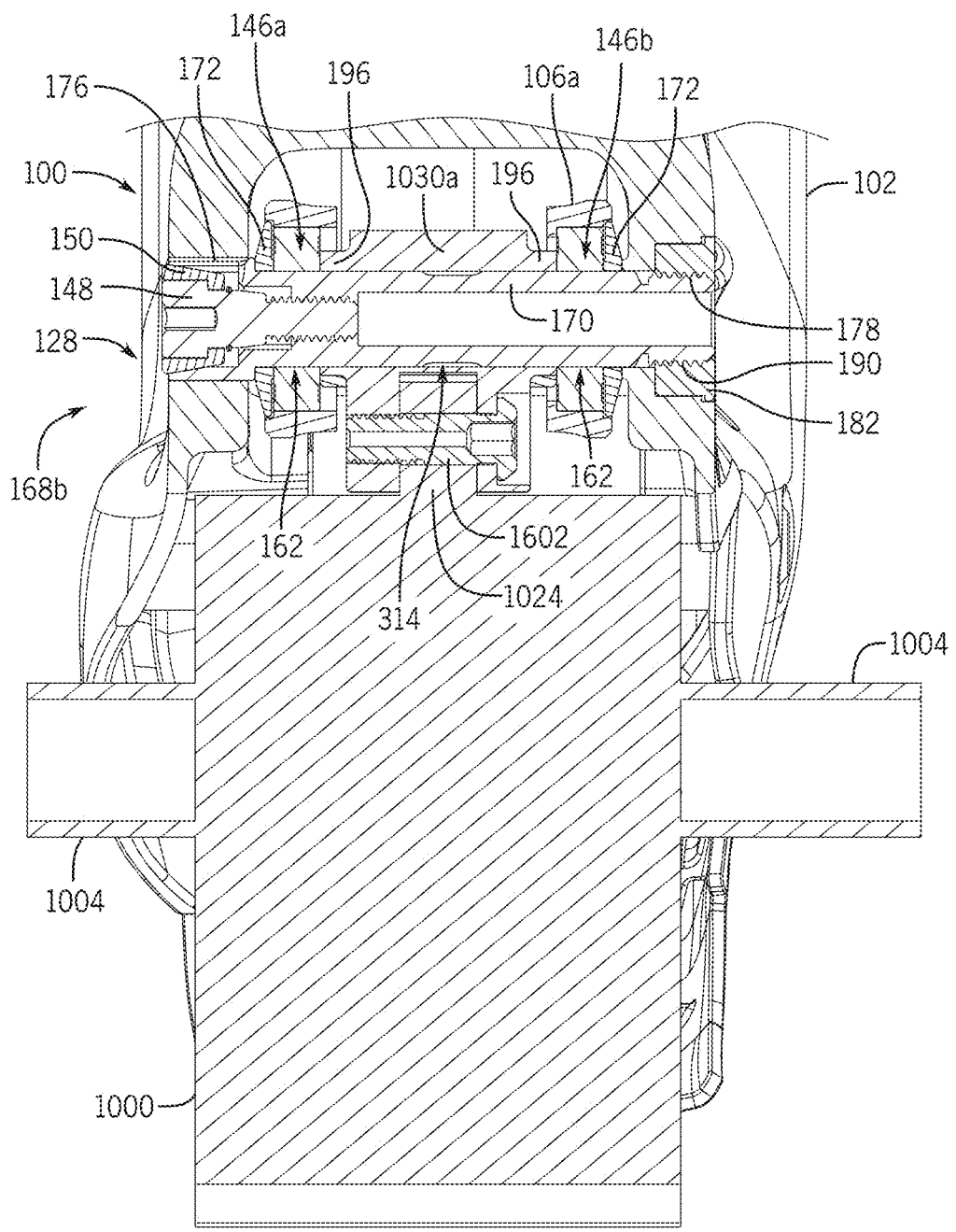
FIG. 16C is a partial section view of the motive power source of FIG. 9 taken along section line 15-15 of FIG. 9 with the axle assembly of FIG. 16A.
Figure 17A:
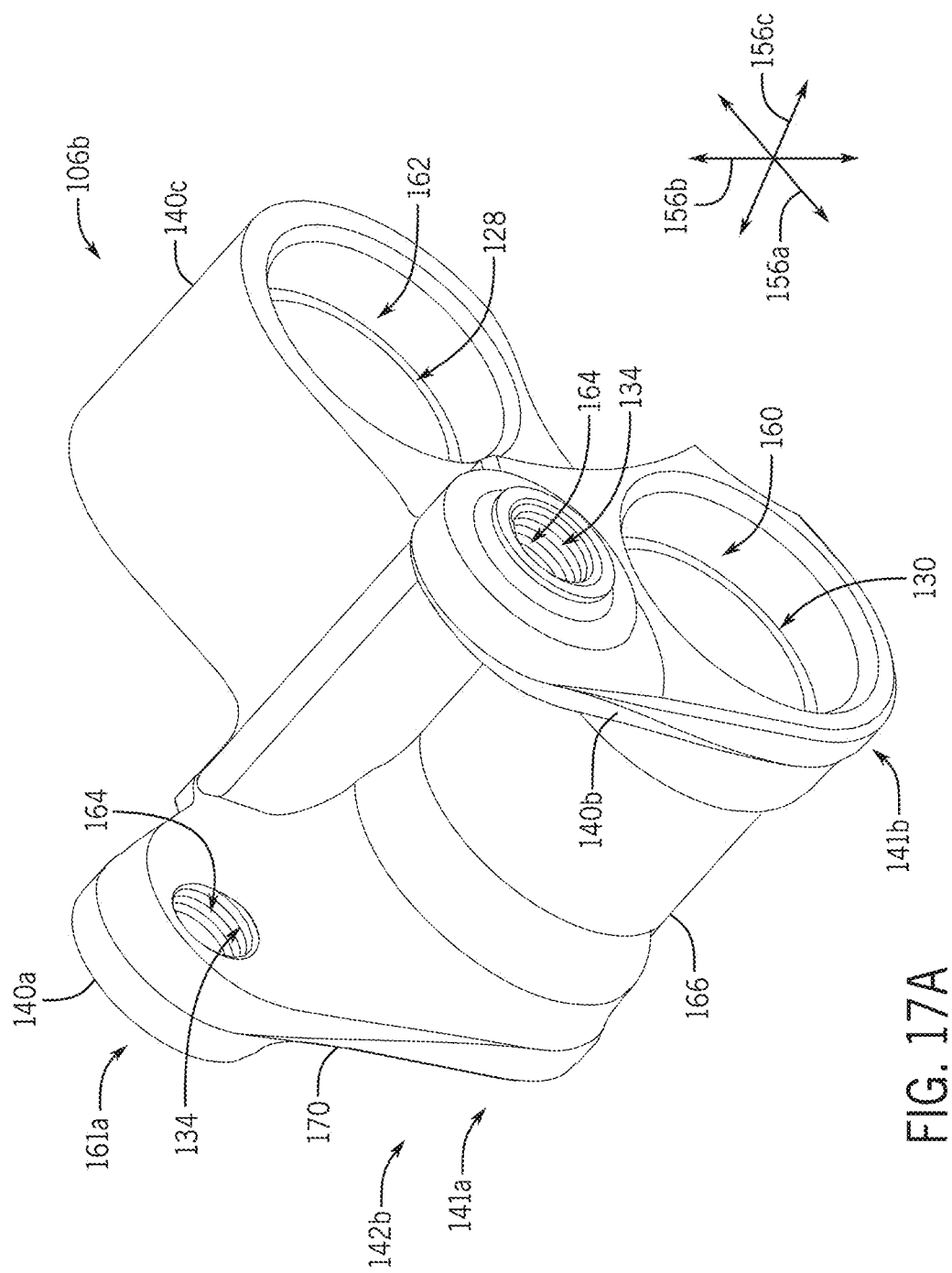
FIG. 17A is an isometric view of an embodiment of a link body of the suspension linkage of FIG. 1.

FIGS. 16A-16C show an example of the motive power source 1000 used with the axle assembly 168b as previously described. The boss extensions 1030a/b may include the locator bosses 196 such that inner race extenders 174b are not used with the axle assembly 18b and the motive power source 1000. The axle assembly 168b may have a similar function and structure when used with the motive power source 1000 as when used with the motive power source 300, which is not repeated, for brevity.

FIG. 17A—FIG. 17D show views of an example of a bottom link 106b. While the bottom link 106a may have an H-like shape, the bottom link 106b may have a Y-like shape. The bottom link 106b has transversely opposing plates 161a/b. Each plate 161a/b being generally I shaped and each defining a first portion 140a/b and a second portion 141a/b in communication with the first portions 104a/b. The transverse plates 161a/b are attached to one another by a connecting portion 166 extending between the second portions 141a/b and spacing the transverse plates 161a/b apart. A lobe 140c extends longitudinally from the connecting portion 166. An aperture 164 is formed in the first lobe 140a/b of each plate 161a/b. The apertures 164 are aligned with each other. An aperture 162 is formed in the lobe 140c. An aperture 160 is formed in the second portions 141a/b of each plate 161a/b. The apertures 160 are aligned with each other and run through the connection portion 166. The bottom links 106a/b may be adapted for use with different motive power sources. For example, the bottom link 106a may be adapted for use with the motive power sources 300 and 1000 as previously described. The bottom link 106b may be adapted for use with motive power sources 1800 and 1900 described herein. The bottom link 106b has a body 142b. The body 142b includes a connecting portion 166 extending in a transverse direction 156c between lobe 140a and lobe 140b disposed at opposite transverse ends of the connecting portion 166. The lobes 140a and 140b extend in lateral direction 156b from the connecting portion 166. The bottom link 106b includes a lobe 140c extending in the longitudinal direction 156a from a central part of the connecting portion 166. The bottom link 106*b* includes a first aperture 160 defined within, and extending through, the connecting portion 166. The bottom link 106*b* includes a second aperture 162 extending through the lobe 140*c*. The bottom link 106*b* includes a third aperture 164 that extends through both the lobe 140*a* and the lobe 140*b*. Any of the first aperture 160, the second aperture 162, and/or the third aperture 164 may form a joint with any portion of the suspended body 102 and/or the suspension linkage 114. For example, the first aperture 160 may form a pivoted joint between the bottom link 106*b* and another part of the suspension linkage 114, such as the chain stay 108. The second aperture 162 may form a pivoted joint between the bottom link 106*b* and the suspended body 102. The third aperture 164 may form a pivoted joint between the bottom link 106*b* and the center link 112. When assembled to the frame 100 with the balance of suspension linkage 114, the IVC[106][108] 130 may be located within the first aperture 160; the IVC[102][106] 128 may be located within the second aperture 162; and the IVC[106][112] 134 may be located within the third aperture 164. In some examples, the IVC[106][108] 130 is concentric with an axis of the first aperture 160. In some examples, the IVC[102][106] 128 is concentric with an axis of the second aperture 162. In some examples, the IVC[106][112] 134 is concentric with an axis of the third aperture 164.

Figure 18A:
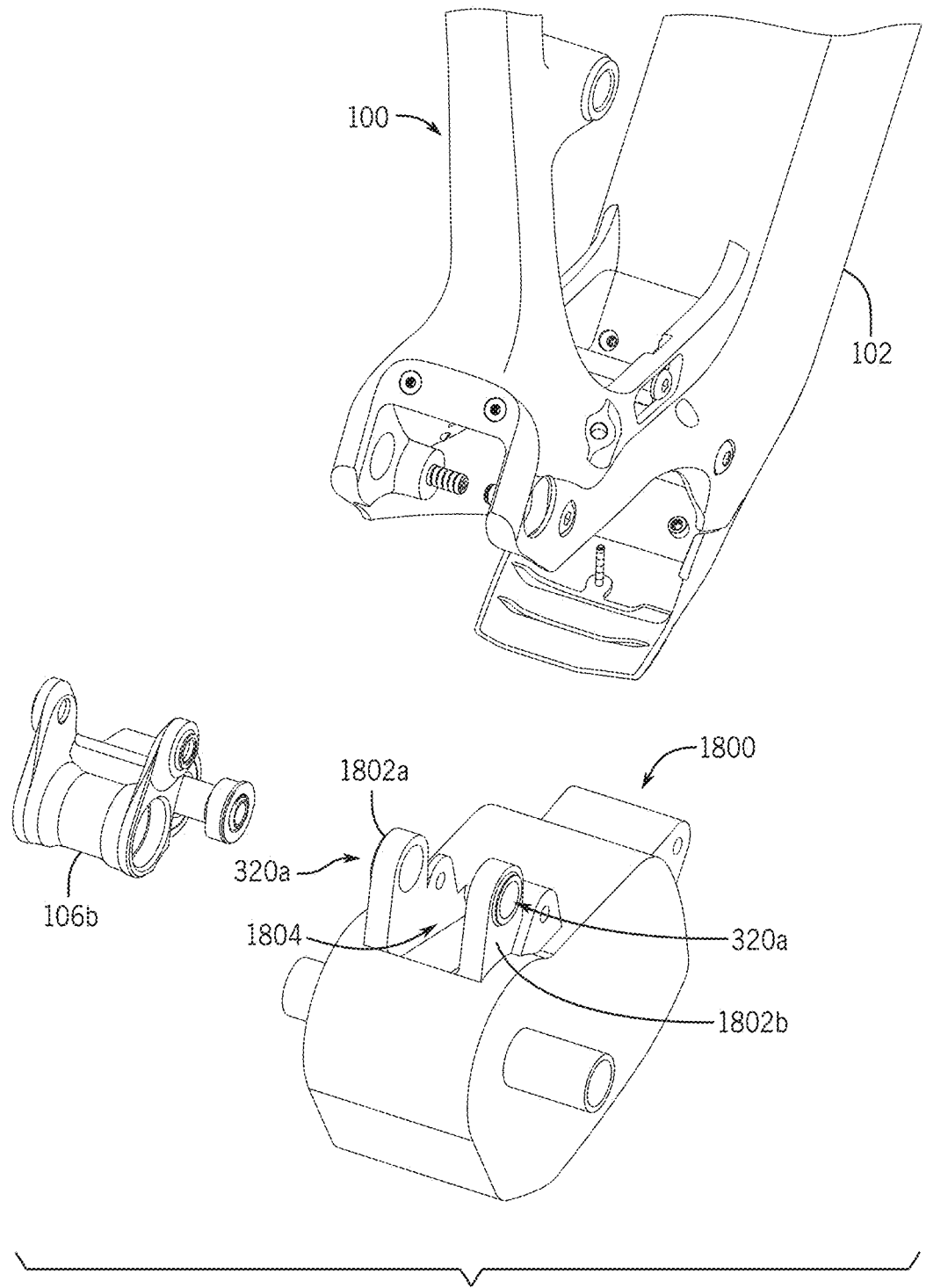
FIG. 18A is a partial isometric view of the frame of FIG. 1 with an embodiment of a motive power source and the axle assembly of FIG. 16B.
Figure 18B:
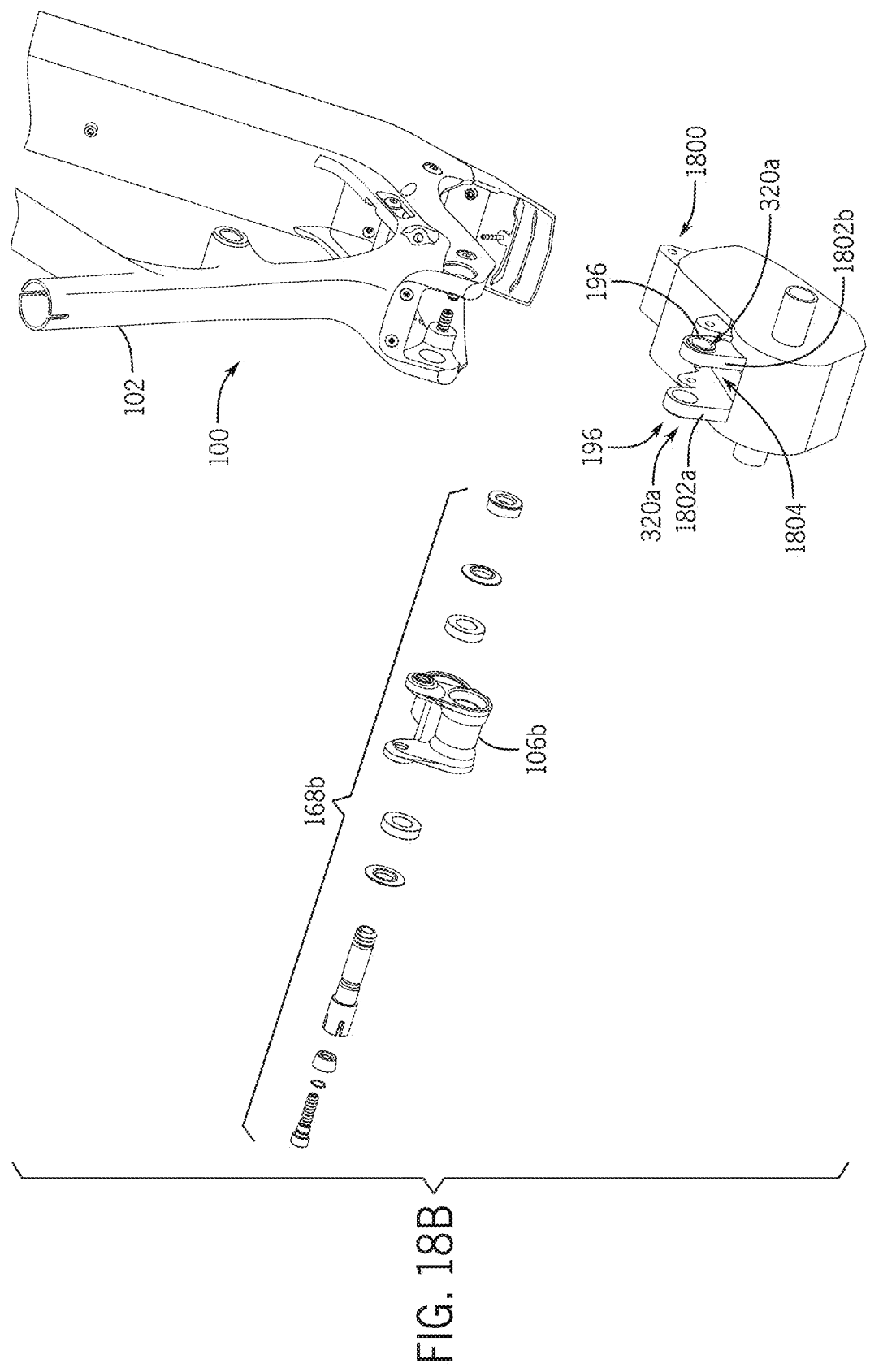
FIG. 18B is a partial exploded view of FIG. 18A.
Figure 18C:
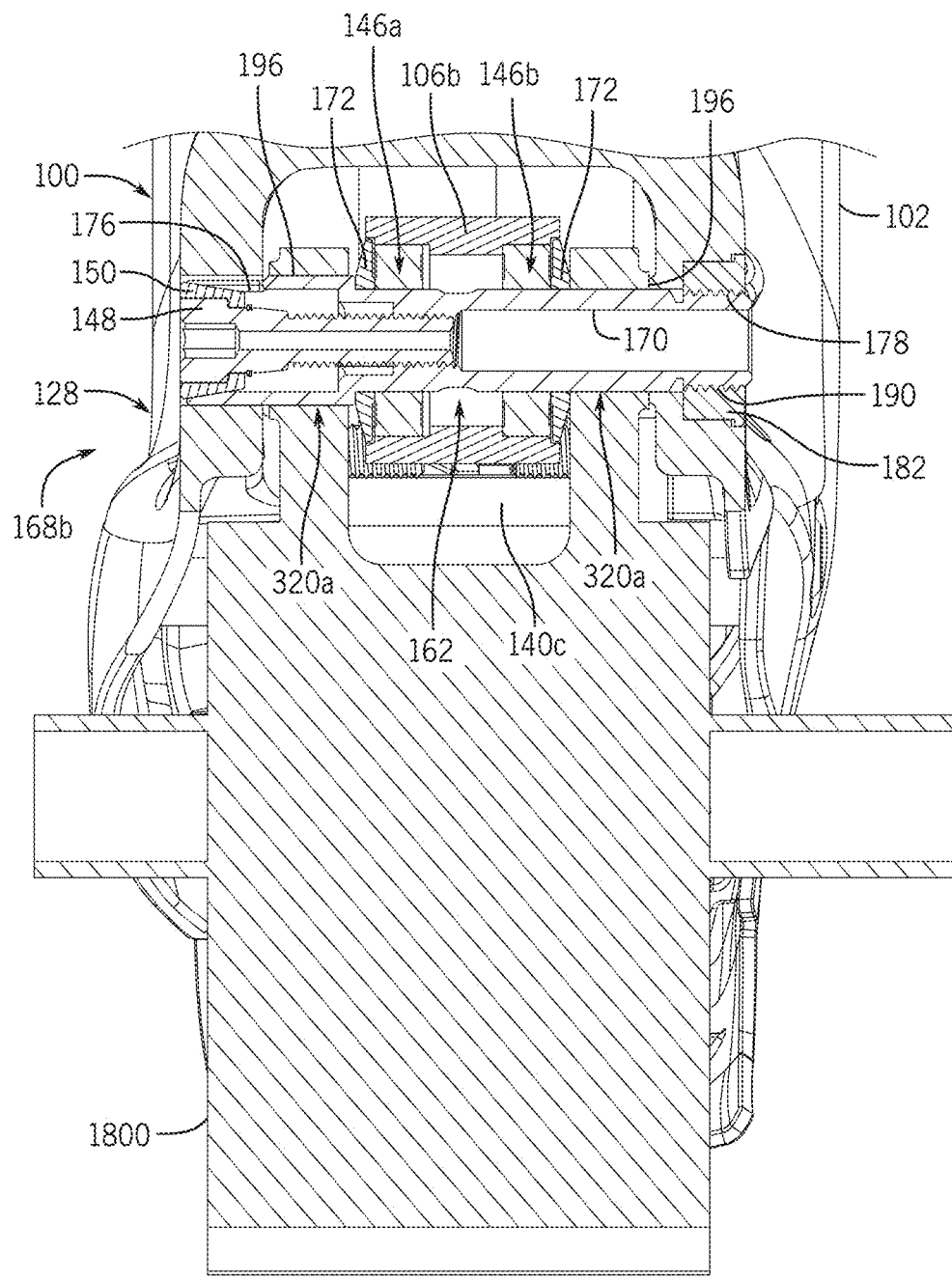
FIG. 18C is a partial section view of the motive power source of FIG. 18A taken along section line 15-15 of FIG. 9 with the axle assembly of FIG. 16B.

FIGS. 18A-18C show an example of a motive power source 1800 used with the axle assembly 168*b* as previously described. The motive power source 1800 is similar to the motive power source 300. However, the rearward boss of the motive power source 1800 is bifurcated into two rearward bosses 1802*a* and 1802*b* spaced apart from one another in the transverse direction 156*c*. A receptacle 1804 is defined between the rearward bosses 1802*a* and 1802*b*. As best seen in FIG. 18C, the receptacle may be adapted to receive the lobe 140*c* of the bottom link 106*b*. When used with the motive power source 1800, the axle assembly 186*b* is assembled as previously described. The axle 170 is passed through the mounting apertures 320 in the motive power source 1800. The axle 170 may be passed through the second aperture 162 of the bottom link 106*b*, and may be threaded into the cap 182 and secured with the fastener 148 and tapered collet 150 as previously described. When assembled with the motive power source 1800, the axle assembly 168*b* may pass through the IVC [102][106] 128. In some examples the axle may be concentric with the IVC [102] [106] 128.

Figure 19A:
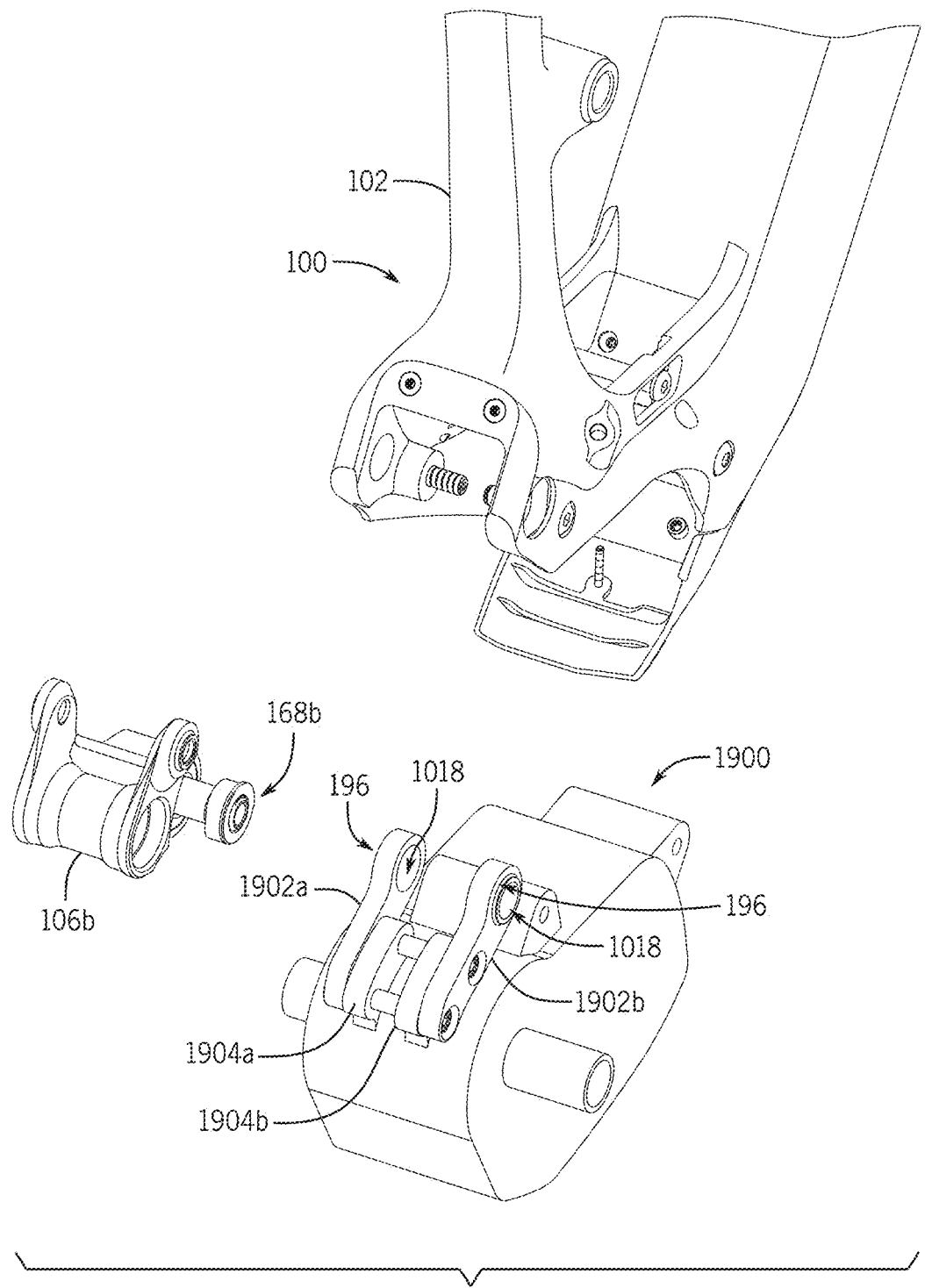
FIG. 19A is a partial isometric view of the frame of FIG. 1 with an embodiment of a motive power source and the axle assembly of FIG. 16B.
Figure 19B:
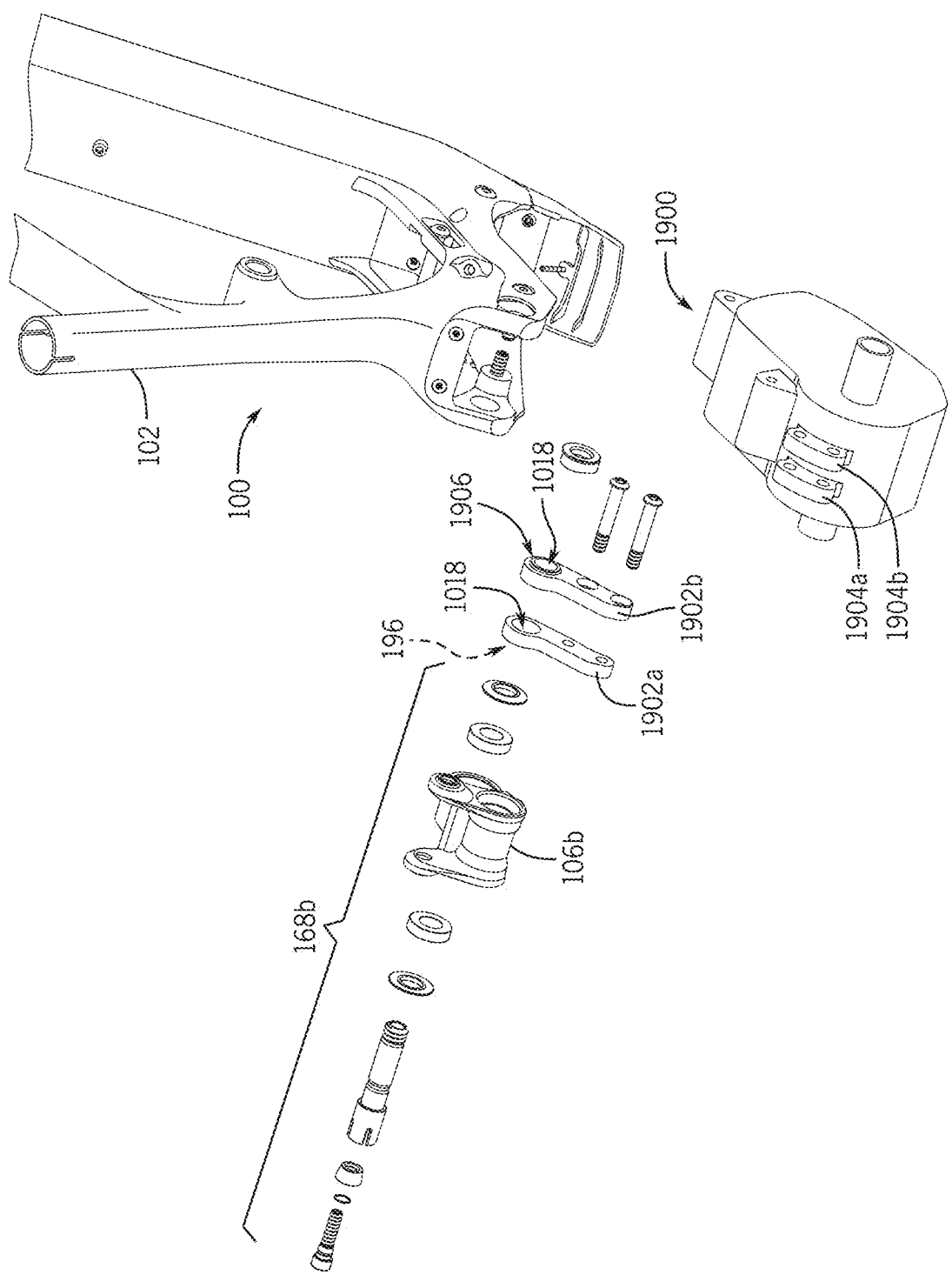
FIG. 19B is a partial exploded view of FIG. 19A.
Figure 19C:
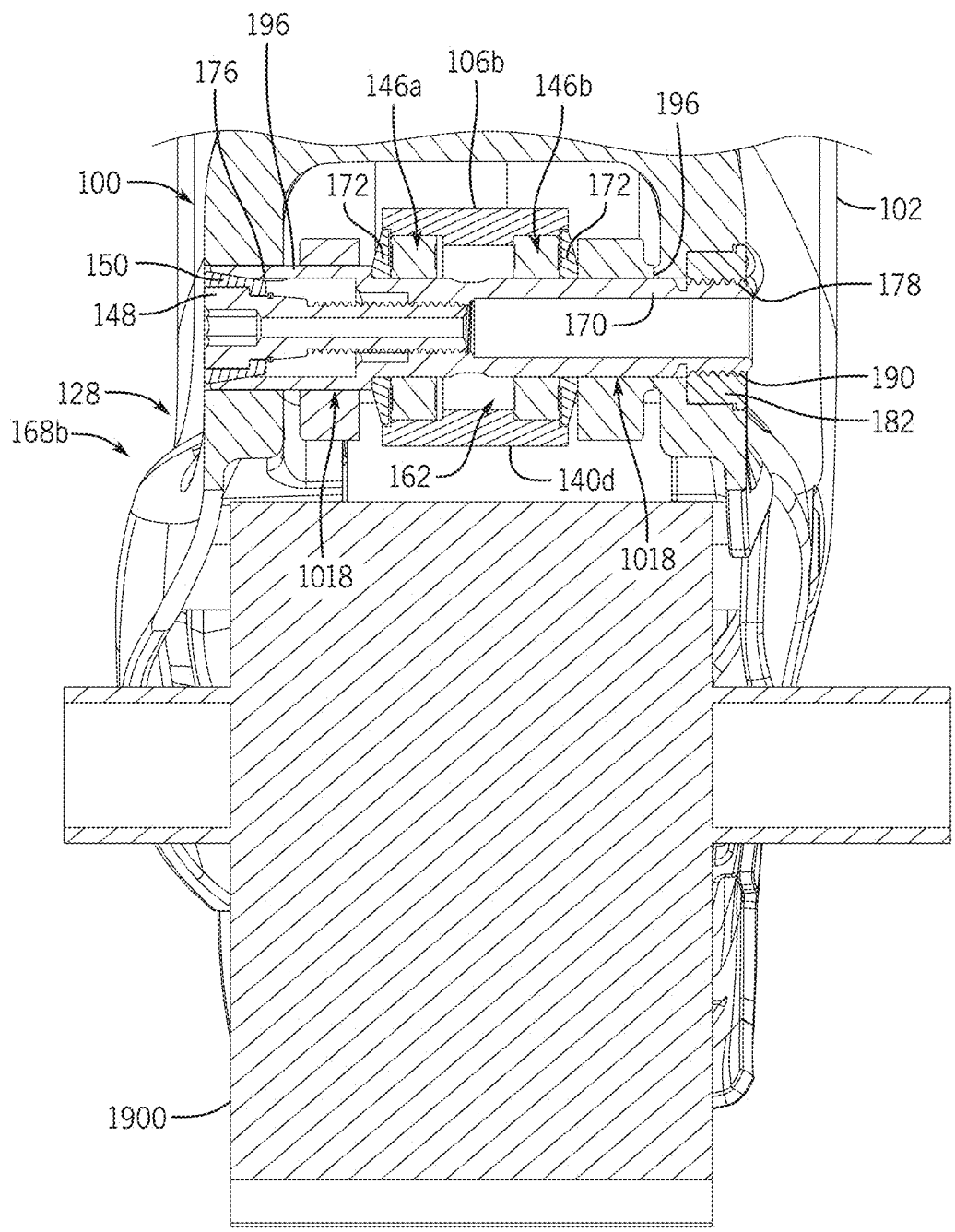
FIG. 19C is a partial section view of the motive power source of FIG. 19A taken along section line 15-15 of FIG. 9 with the axle assembly of FIG. 16B.

FIGS. 19A-19C show an example of a motive power source 1900 used with the axle assembly 168*b* as previously described. The motive power source 1900 is similar to the motive power source 1000. However, the motive power source 1900 includes two removable boss extensions 1902*a* and 1902*b* spaced apart in the transverse direction 156*c*. The motive power source 1900 includes protrusions 1904*a* and 1904*b* similar to the protrusion 1024 of the motive power source 1000. The boss extensions 1902*a/b* are coupled to the respective protrusions 1904*a/b* by one or more fasteners 1034 as previously described with respect to the motive power source 1000. The boss extensions 1902*a* and 1902*b* may include the locator bosses 196 and may include mounting apertures 1018 therethrough, as previously described. The function, structure and benefits of the motive power source 1900 may be similar to those of the motive power sources 300, 1000, and 1800 described herein. A receptacle 1804 is defined between the rearward bosses 1802*a* and 1802*b*. As best seen in FIG. 18C, the receptacle 1906 may be adapted to receive the lobe 140*c* of the bottom link 106*b*. When used with the motive power source 1900, the axle assembly 186*b* is assembled as previously described. The axle 170 is passed through the mounting apertures 1018 in the boss extensions 1902*a/b* of the motive power source 1900. The axle 170 may be passed through the second aperture 162 of the bottom link 106*b*, and may be threaded into the cap 182 and secured with the fastener 148 and tapered collet 150 as previously described. When assembled with the motive power source 1900, the axle assembly 168*b* may pass through the IVC [102][106] 128. In some examples the axle may be concentric with the IVC [102] [106] 128.

Providing for the mounting of the motive power source 300, 1000, 1800, and/or 1900 to the frame 100 and to the suspension linkage 114, such as described herein may provide for a compact frame 100, with fewer parts, joints, and a simpler construction than with traditional motor mounts. For example, by using a motor mounting aperture such as the mounting aperture 320 and/or 1018 to both mount the motor and act as a suspension joint, the need for separate motor mounts and suspension joints may be reduced or eliminated. Additionally, the forward portion 308 of the motive power source 300 may be received in the receptacle 144 formed in the suspended body 102, thereby forming a more compact two-wheeled vehicle.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A two-wheeled vehicle comprising:
    a suspended body;
    a suspension linkage including a bottom link body pivotally coupled to the suspended body at a joint; and
    a motive power source coupled to both the suspended body and the bottom link body at the joint, the motive power source including a housing forming an exterior portion of thereof, wherein a removable first boss extends from the housing;
    a second boss is selectively removable from the housing, wherein:
        the removable first boss defines an IVC in a first location when coupled to the housing while the second boss is not coupled to the housing; and
        the second boss defines the IVC in a second location when coupled to the housing while the removable first boss is not coupled to the housing.

2. The two-wheeled vehicle of claim 1, further comprising:
    a first securement structure formed in the suspended body;
    a second securement structure formed in the bottom link body;
    the removable first boss having a third securement structure; and
    an axle coupled to the first, second, and third securement structures.

3. The two-wheeled vehicle of claim 2, wherein an instantaneous velocity center (IVC) of the suspension linkage is located within the first, second, and third securement structures.

4. The two-wheeled vehicle of claim 2, wherein the first securement structure, the second securement structure, and the third securement structure are concentric with one another at the joint.

5. The two-wheeled vehicle of claim 1, further comprising:
    an axle assembly including:
        an axle, wherein the axle includes an expandable portion at a first end of an elongate body and an internally threaded portion located proximate to the expandable portion;
        a tapered collet including an aperture therethrough;
        a fastener adapted to be received in the aperture and including an externally threaded portion adapted to mate with the internally threaded portion of the axle, wherein when the fastener is mated with the axle, the fastener causes the tapered collet to expand the expandable portion to secure the axle assembly to the suspended body.

6. The two-wheeled vehicle of claim 2, wherein the removable first boss is selectively removable from the housing.

7. The two-wheeled vehicle of claim 1, wherein the housing is a load bearing member of the suspension linkage.

8. The two-wheeled vehicle of claim 1, wherein the suspension linkage includes:
    a plurality of linkage bodies including:
        the suspended body, a second body, the bottom link body, a fourth body, a fifth body, and a sixth body operatively connected defining at least seven primary instantaneous velocity centers (IVCs) wherein;
        the suspended body is a binary link;
        a shock assembly is configured to resist movement between two or more of the suspended body, the second body, the bottom link body, the fourth body, the fifth body, or the sixth body; and
        at least one primary IVC migration path reverses as the suspension linkage moves from an at least partially extended state to an at least partially compressed state.

9. The two-wheeled vehicle of claim 8, wherein the plurality of linkage bodies define a driven wheel-path.

10. The two-wheeled vehicle of claim 8, wherein:
    the suspended body (102) includes a jointed connection with the bottom link body (106) defining a primary IVC[102][106] (128), and a jointed connection with the fifth body (110) defining a primary IVC[102][110] (124);
    the bottom link body (106) includes a jointed connection with the fourth body (108) defining a primary IVC[106][108] (130), and a jointed connection with the sixth body (112) defining a primary IVC[106][112] (134);
    the fifth body (110) includes a jointed connection with the second body (104) defining a primary IVC[104][110] (132), and a jointed connection with the sixth body (112) defining a primary IVC[110][112] (122); and
    the second body (104) includes a jointed connection with the fourth body (108) defining a primary IVC[104][108] (126), wherein a migration path defined by the IVC[106][112] (134) reverses as the suspension linkage moves from the at least partially extended state to the at least partially compressed state.

11. The two-wheeled vehicle of claim 10, wherein a migration path defined by the IVC[106][108] (130) reverses as the suspension linkage moves from the at least partially extended state to the at least partially compressed state.

12. The two-wheeled vehicle of claim 10, wherein the second body (104) is a driven wheel carrier body or a brake carrier body.

13. The two-wheeled vehicle of claim 10, wherein the second body (104) is a driven wheel carrier body and a brake carrier body.

14. The two-wheeled vehicle of claim 10, wherein the fourth body (108) is a driven wheel carrier body or a brake carrier body.

15. The two-wheeled vehicle of claim 10, wherein the fourth body (108) is a driven wheel carrier body and a brake carrier body.

16. The two-wheeled vehicle of claim 10, wherein:
a lower base line is defined by the primary IVC[102][106] (128) and the primary IVC[106][108] (130);
an upper base line is defined by the primary IVC[102][110] (124) and the primary IVC[104][110] (132); and
the primary IVC[110][112] (122) is located outside the upper and lower base lines.

17. The two-wheeled vehicle of claim 10, wherein a line defined by the primary IVC[106][112] (134) and the primary IVC[110][112] (122) is located outside the primary IVC [102][106] (128) and the primary IVC[106][108] (130).

18. The two-wheeled vehicle of claim 10, wherein the primary IVC[106][112] (134) and the primary IVC[106][108] (130) are on the same side of the primary IVC[102][106] (128).

19. A two-wheeled vehicle comprising:
a suspended body;
a suspension linkage including a bottom link body pivotally coupled to the suspended body at a joint;
a motive power source coupled to both the suspended body and the bottom link body at the joint, the motive power source including a housing forming an exterior portion of thereof, wherein a removable first boss extends from the housing; and
an axle assembly including:
an axle, wherein the axle includes an expandable portion at a first end of an elongate body and an internally threaded portion located proximate to the expandable portion;
a tapered collet including an aperture therethrough;
a fastener adapted to be received in the aperture and including an externally threaded portion adapted to mate with the internally threaded portion of the axle, wherein when the fastener is mated with the axle, the fastener causes the tapered collet to expand the expandable portion to secure the axle assembly to the suspended body.

* * * * *